(12) United States Patent
McAlear

(10) Patent No.: US 6,598,232 B1
(45) Date of Patent: Jul. 22, 2003

(54) HYBRID AMPLIFIER-REGENERATOR FOR OPTIMIZING CABLE NETWORK TRANSMISSIONS

(75) Inventor: James Allan McAlear, Stittsville (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/189,021

(22) Filed: Nov. 10, 1998

(51) Int. Cl.$^7$ .............................................. H04N 7/173
(52) U.S. Cl. ...................... 725/126; 725/118; 725/121; 725/127; 455/15; 375/211; 370/486; 370/487; 370/490
(58) Field of Search ................................ 725/118, 121, 725/124–129, 111; 455/14, 20, 15; 375/211, 213, 214; 370/486, 487, 490; H04N 7/173

(56) References Cited

U.S. PATENT DOCUMENTS

| | | | |
|---|---|---|---|
| 4,775,984 A | | 10/1988 | Jaffre et al. ..................... 375/17 |
| 4,876,695 A | | 10/1989 | Witters et al. .................. 375/3 |
| 5,050,188 A | * | 9/1991 | Dirr ............................. 375/260 |
| 5,485,630 A | * | 1/1996 | Lee et al. ..................... 725/105 |
| 5,499,047 A | * | 3/1996 | Terry et al. .................. 370/486 |
| 5,719,872 A | * | 2/1998 | Dubberly et al. ........... 370/487 |
| 5,765,097 A | * | 6/1998 | Dail ............................. 725/125 |
| 5,771,224 A | * | 6/1998 | Seki et al. ................... 370/206 |
| 5,815,794 A | * | 9/1998 | Williams .................... 725/106 |
| 5,878,325 A | * | 3/1999 | Dail ............................ 725/125 |
| 6,078,950 A | * | 6/2000 | Heidemann et al. ........ 370/447 |

FOREIGN PATENT DOCUMENTS

WO    WO9701906    1/1997

* cited by examiner

*Primary Examiner*—Vivek Srivastava
*Assistant Examiner*—Jason Salce

(57) ABSTRACT

A hybrid amplifier and regenerator (HAR) device is designed for use in a communications network for carrying downstream traffic in a forward frequency band and for carrying upstream traffic in a reverse frequency band spaced from the forward frequency band and below the forward frequency band. The hybrid amplifier and regenerator (HAR) device comprises an analog amplifier for amplifying the downstream traffic and a digital regenerator. The digital regenerator comprises mapping circuitry for mapping digital upstream traffic carried in at least one ramp band which is part of the reverse frequency band to digital upstream traffic carried in at least one express band which is also part of the reverse frequency band but spaced from the at least one ramp band, and an express band transmitter for transmitting digital upstream traffic from the mapping circuitry in the at least one express band.

39 Claims, 11 Drawing Sheets

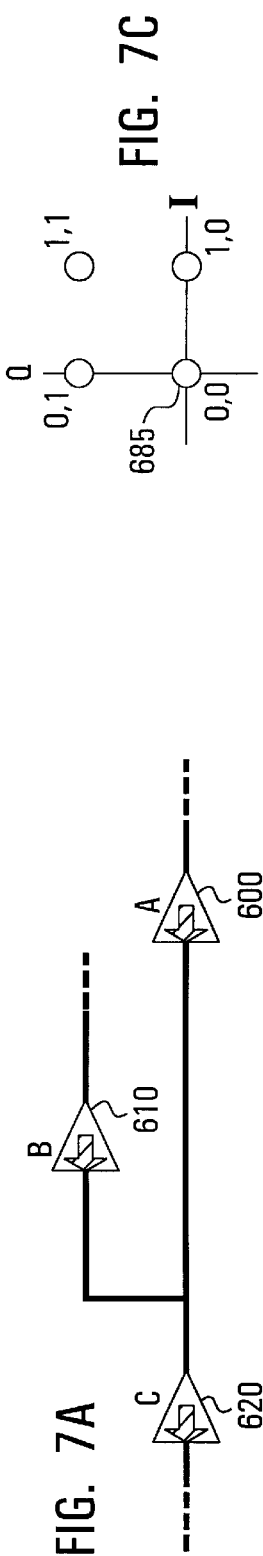
FIG. 7A
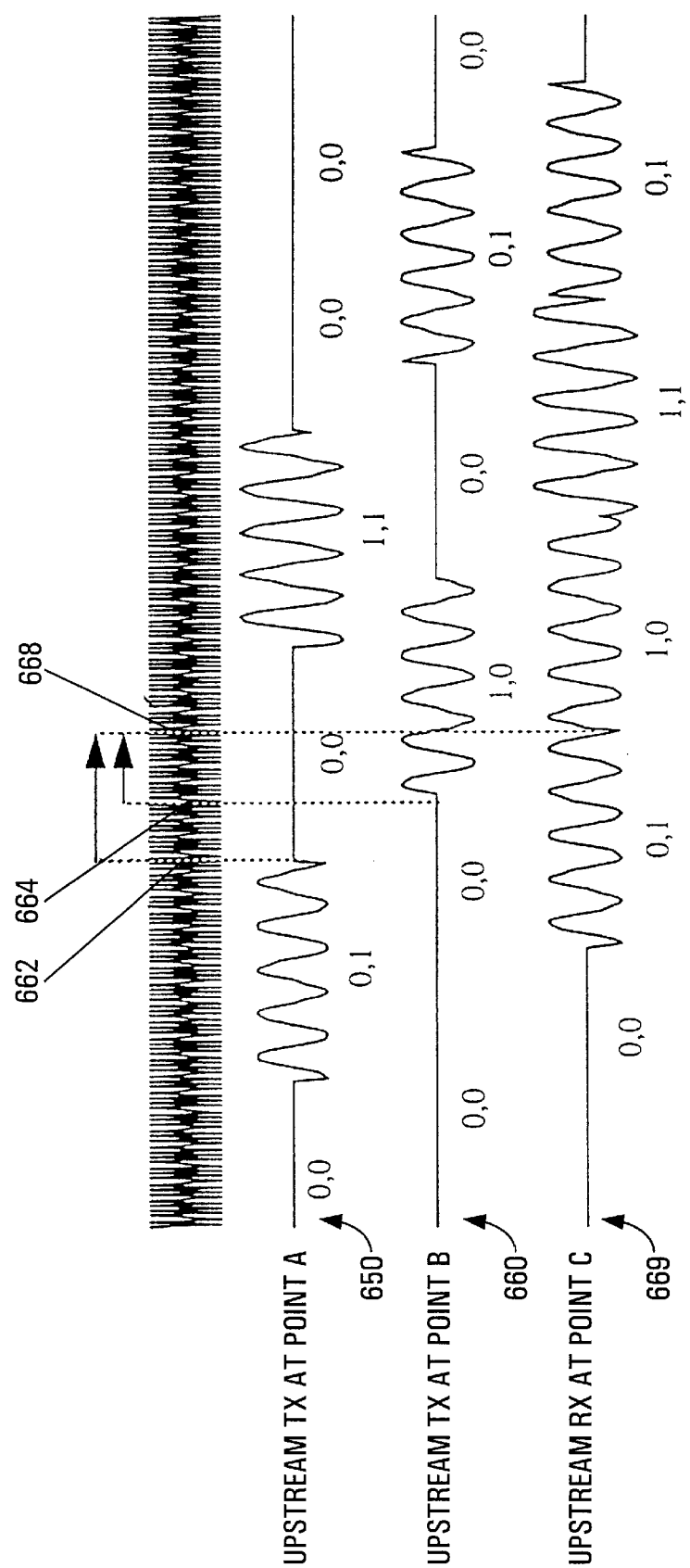
FIG. 7B
FIG. 7C

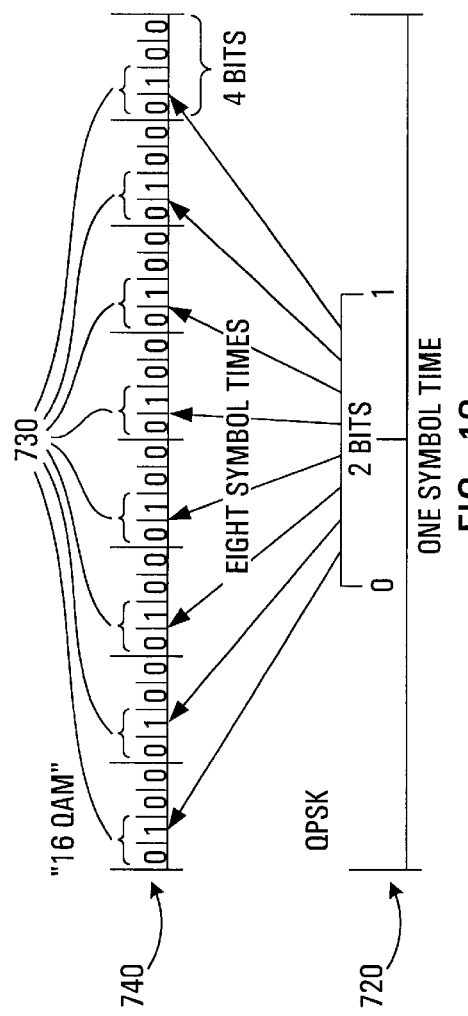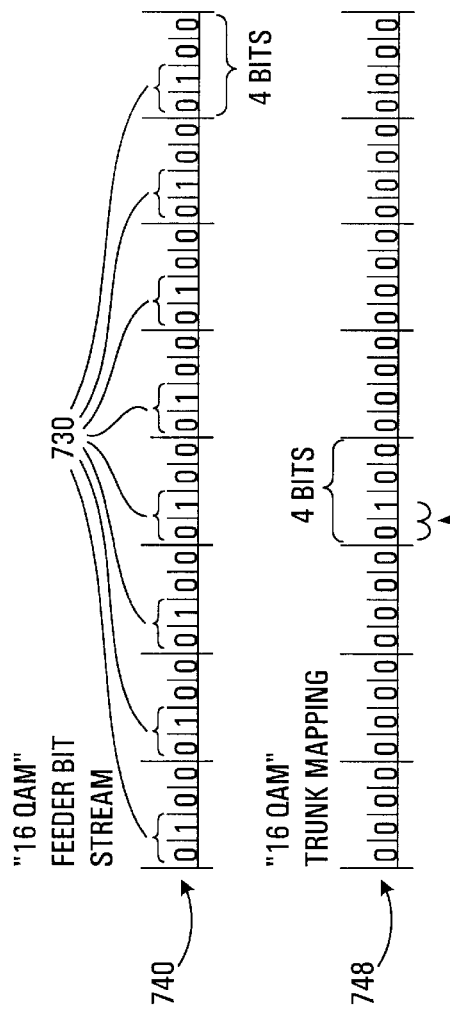

HYBRID AMPLIFIER-REGENERATOR FOR OPTIMIZING CABLE NETWORK TRANSMISSIONS

FIELD OF THE INVENTION

The present invention relates to cable television communication networks and, in particular, to optimizing upstream transmissions in such networks.

BACKGROUND OF THE INVENTION

Cable networks, sometimes referred to as CATV (community antenna TV) networks, serving residential and business premises not only provide a medium for the delivery of audio and video traffic (e.g. television and radio) for which these networks were originally designed but also provide a medium for the delivery of new services such as telephony, Internet, multimedia and data services. The new services can provide the cable system provider with an additional source of revenue.

Originally, many cable networks were designed to carry audio and video traffic (e.g. television and radio) only downstream from a cable system provider to cable subscribers. Today, many of the new services, such as telephony, require the cable network not only to carry traffic downstream from the cable system provider to the cable subscribers (downstream traffic) but also to carry traffic upstream from the cable subscribers to the cable system provider (upstream traffic). However, as shown in FIG. 1, conventional cable networks are typically implemented as a large analog bus, with analog amplifiers located along coaxial cable to boost signals where required. Since all upstream traffic typically accumulates at a single receiver point at the cable system provider, typically called the system head end, a particular problem that has been experienced is the cumulative effect of amplifier generated noise and signal distortion from the analog amplifiers on the upstream traffic. Moreover, another problem that has been experienced with the upstream traffic is the cumulative effect of ingress noise appearing at the system head end from spurious sources such as noise from cable subscriber equipment. A catastrophic ingress of noise from even a single cable subscriber can prevent any reliable upstream traffic from other cable subscribers. It is typically very difficult for a cable network provider to reduce ingress noise introduced from cable subscribers since the ingress noise is often introduced somewhere inside the premises of the cable subscribers. Other sources of ingress noise include noise from amateur radio (HAM) operators operating near the cable (CATV) network. Noise from amateur radio operators typically enters the cable (CATV) network at a point or points in the coaxial cable where the shield of the coaxial cable has been compromised. The cumulative effect of the amplifier generated noise and signal distortion and the ingress noise limits the capacity and reliability of the cable (CATV) network to carry upstream traffic.

To,minimize the problems identified above, persons skilled in the art have used hybrid fibre-coax (HFC) architectures for cable networks. Fibre optic cable is used on a trunk from a system head end to various fibre nodes. Coaxial cable is connected from the fibre nodes to a plurality of cable subscribers. Analog amplifiers are used on the coaxial cable to boost the downstream traffic and the upstream traffic. The analog amplifiers often introduce amplifier generated noise and signal distortion on the upstream traffic and the downstream traffic. The amplifier generated noise and signal distortion and any ingress noise from spurious sources (typically from the cable subscribers) all converge and accumulate at the respective fibre node. Finally, all the amplifier generated noise and signal distortion introduced by the analog amplifiers and all the ingress noise converge and accumulate at the system head end (along with all the upstream traffic).

With a hybrid fibre-coax (HFC) architecture, very little ingress noise is picked up by the trunks. However, since much of the ingress noise originates at or near the cable subscribers, much of the ingress noise is not fundamentally reduced as compared with a conventional cable network using only coaxial cable, although improvements are realized since all the amplifier generated noise and signal distortion from the analog amplifiers and the ingress noise is divided over multiple fibre nodes. The cumulative effect of the amplifier generated noise and signal distortion and the ingress noise on the system head end limits the reliability and capacity of the conventional cable network using the hybrid fibre-coax (HFC) architecture to carry upstream traffic.

In order to minimize the problems identified above, persons skilled in the art have proposed that the upstream traffic be sent using digital signals and that digital regenerators be used typically at each analog amplifier stage. The digital regenerators regenerate the digital signals and help clean out noise. The use of digital regenerators allow for much higher transmission capacity and reliability. PCT patent publication WO97/01906, published on Jan. 16, 1997, discloses the use of digital regenerators to regenerate and reduce noise on upstream traffic carried outside the recommended bandwidth of coaxial cable used in a conventional cable network. Persons skilled in the art have also attempted to address the above noted problems by using relatively costly, noise immune modulation techniques on the upstream traffic e.g. Code Division Multiplex Access (CDMA) techniques.

SUMMARY OF THE INVENTION

It is an object of the present invention to provide an improved hybrid amplifier and regenerator (HAR) device, an improved digital regenerator, an improved communication network, a method for carrying downstream traffic and upstream traffic in a communications network, and a method for processing digital upstream traffic in a digital regenerator in which the above mentioned problems are obviated or mitigated.

In accordance with one aspect of the present invention there is provided a hybrid amplifier and regenerator (HAR) device for use in a communications network for carrying downstream traffic in a forward frequency band and for carrying digital upstream traffic in a reverse frequency band spaced from the forward frequency band. The hybrid amplifier and regenerator (HAR) device comprises an analog amplifier for amplifying the downstream traffic and a digital regenerator. The digital regenerator comprises mapping circuitry for mapping digital upstream traffic carried in at least one ramp band which is part of the reverse frequency band to digital upstream traffic carried in at least one express band which is also part of the reverse frequency band but spaced from the at least one ramp band, and an express band transmitter for transmitting digital upstream traffic from the mapping circuitry in the at least one express band.

In accordance with another aspect of the present invention there is provided a digital regenerator for use in a hybrid amplifier and regenerator (HAR) device. The digital regenerator comprises mapping circuitry for mapping digital upstream traffic carried in at least one ramp band which is part of the reverse band to digital upstream traffic carried in at least one express band which is also part of the reverse band but spaced from the at least one ramp band, and an express band transmitter for transmitting digital upstream traffic from the mapping circuitry in the at least one express band.

In accordance with another aspect of the present invention there is provided a communications network for carrying downstream traffic from a system head end to a plurality of cable subscribers within a forward frequency band, and for carrying digital upstream traffic from the plurality of cable subscribers to the system head end in a reverse frequency band which is spaced from the forward frequency band. The communications network comprises transmission means for interconnecting the system head end and the plurality of cable subscribers. The communications network further comprises a plurality of hybrid amplifier and regenerator (HAR) devices located at spaced intervals along the transmission means. Each hybrid amplifier and regenerator (HAR) device comprises amplification circuitry for amplifying said downstream traffic and a digital regenerator. Thee digital regenerator comprises mapping circuitry for mapping digital upstream traffic carried in at least one ramp band which is part of the reverse frequency band to digital upstream traffic carried in at least one express band which is also part of the reverse frequency band but spaced from the at least one ramp band, and an express band transmitter for transmitting digital upstream traffic from the mapping circuitry in the at least one express band. The communications network further comprises cable modems for receiving the downstream traffic for the cable subscribers and for sending the digital upstream traffic from the cable subscribers in the ramp bands.

In accordance with another aspect of the present invention there is provided a method for carrying in a communications network downstream traffic in a forward frequency band and digital upstream traffic in a reverse frequency band which is spaced from the forward frequency band. The method comprises amplifying and transmitting said downstream traffic in the forward frequency band, mapping digital upstream traffic carried in at least one ramp band which is part of the reverse frequency band to digital upstream traffic carried in at least one express bands which is also part of the reverse frequency band but spaced from the at least one ramp band, and transmitting digital upstream traffic in the at least one express band.

In accordance with another aspect of the present invention there is provided a method for processing digital upstream traffic in a digital regenerator. The method comprises mapping digital upstream traffic carried in at least one ramp band which is part of the reverse frequency band to digital upstream traffic carried in at least one express band which is also part of the reverse frequency band but spaced from the at least one ramp band, and transmitting digital upstream traffic in the at least one express band.

In accordance with another aspect of the present invention there is provided a hybrid amplifier and regenerator (HAR) device for use in a communications network for carrying downstream traffic in a forward frequency band and for carrying digital upstream traffic in a reverse frequency band spaced from the forward frequency band. The hybrid amplifier and regenerator. (HAR) device comprises an analog amplifier for amplifying said downstream traffic, and a digital regenerator. The digital regenerator comprises mapping circuitry for mapping digital upstream traffic carried in a ramp band which is part of the reverse frequency band to a plurality of virtual channels carried in an express band which is also part of the reverse frequency band but spaced from the ramp band, and an express band transmitter for transmitting the virtual channels from the mapping circuitry in the express band.

In accordance with another aspect of the present invention there is provided a hybrid amplifier and regenerator (HAR) device for use in a communications network for carrying downstream traffic in a forward frequency band and for carrying digital upstream traffic in a reverse frequency band spaced from the forward frequency band. The hybrid amplifier and regenerator. (HAR) device comprises an analog amplifier for amplifying said downstream traffic, and a digital regenerator. The digital regenerator comprises mapping circuitry for mapping digital upstream traffic carried in a plurality of virtual channels in an express band which is part of the reverse frequency band to a single virtual channel in the express band, and an express band transmitter for transmitting the single virtual channel from the mapping circuitry in the express band.

In accordance with another aspect of the present invention there is provided a digital regenerator for use in a hybrid amplifier and regenerator (HAR) device. The digital regenerator comprises mapping circuitry for mapping digital upstream traffic carried in a ramp band which is part of the reverse frequency band to a plurality of virtual channels carried in an express band which is also part of the reverse frequency band but spaced from the ramp band, and an express band transmitter for transmitting the virtual channels from the mapping circuitry in the express band.

In accordance with another aspect of the present invention there is provided a digital regenerator for use in a hybrid amplifier and regenerator (HAR) device. The digital regenerator comprises mapping circuitry for mapping digital upstream traffic carried in a plurality of virtual channels in an express band which is part of the reverse frequency band to a single virtual channel in the express band, and an express band transmitter for transmitting the single virtual channel from the mapping circuitry in the express band.

In accordance with another aspect of the present invention there is provided a method for multiplexing a plurality of express band transmissions, each express band transmission having a duration, from a plurality of respective downstream hybrid amplifier and regenerator (HAR) devices at an upstream hybrid amplifier and regenerator (HAR) device in the communications network. The method comprises determining a start time for each express band transmission which ensures that the express band transmissions will arrive at the upstream hybrid amplifier and regenerator (HAR) device without interfering with each other; and, beginning each express band transmission from each respective downstream hybrid amplifier and regenerator (HAR) device at each respective start time.

BRIEF DESCRIPTION OF THE DRAWINGS

A detailed description of the preferred embodiments is provided below with reference to the following drawings, in which:

FIG. 7A is a diagram showing a portion of a cable (CATV) network in which upstream traffic from two hybrid amplifier and regenerator (HAR) devices converge on one hybrid amplifier and regenerator (HAR) device;

FIG. 7B is a diagram showing the distributed multiplexing used in a preferred embodiment of the present invention;

FIG. 7C is a constellation diagram of a 4 Quadrature Amplitude Modulation (4 QAM) scheme;

FIG. 10 is a diagram showing the mapping from the ramp band into multiple virtual channels in the express band used in another preferred embodiment of the present invention;

FIG. 11 is a diagram showing the mapping from the multiple virtual channels in the express band into one virtual channel in the express band used in another preferred embodiment of the present invention;

DETAILED DESCRIPTION OF THE PREFERRED EMBODIMENTS

Figure 1:
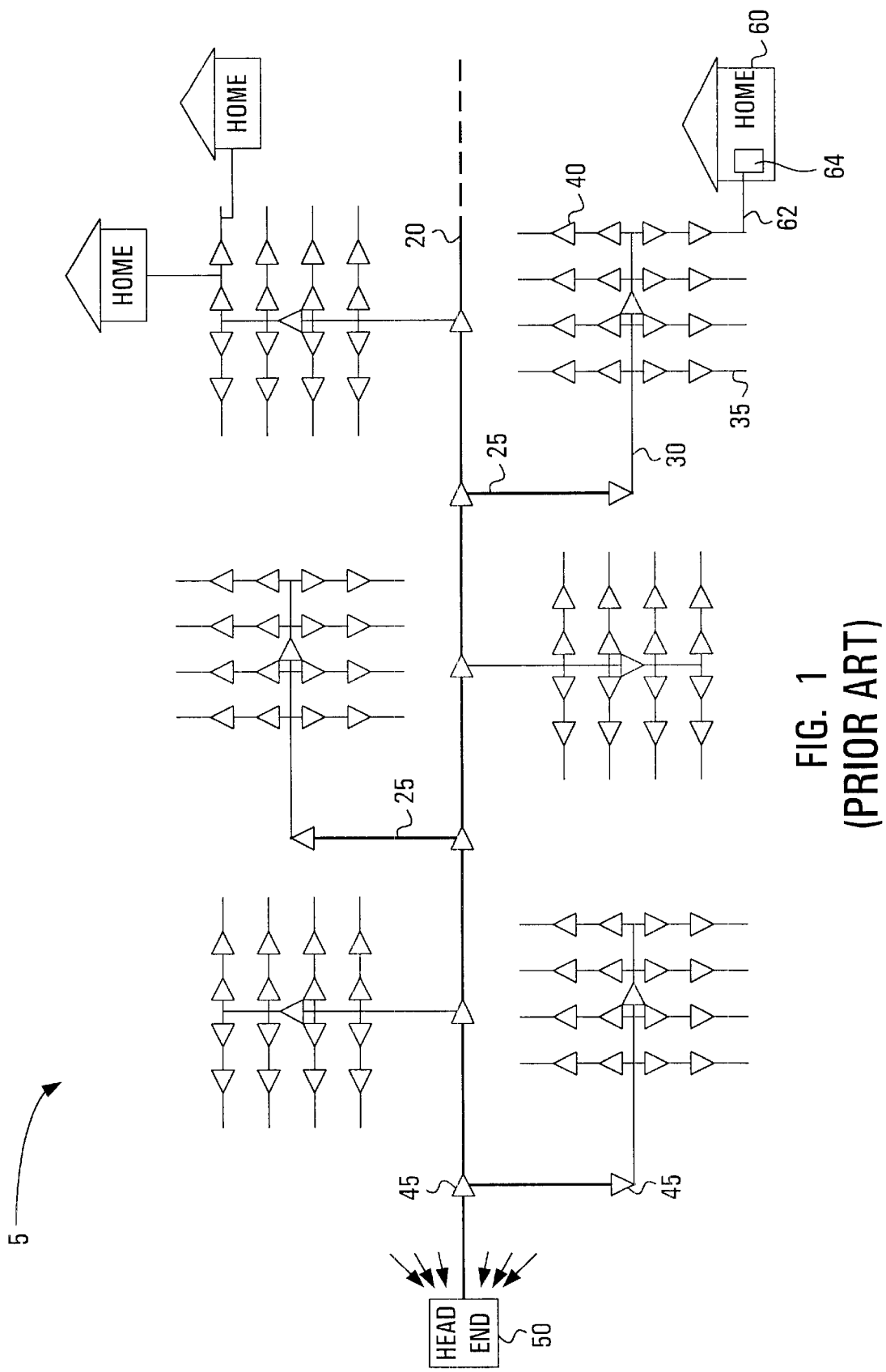
FIG. 1 is an network architecture diagram showing a conventional cable (CATV) network using coaxial cable.

FIG. 1 shows a conventional cable (CATV) network 5 which consists of a trunk 20, a plurality of secondary trunks 25, a plurality of feeder lines 30, a plurality of secondary feeder lines 35, a plurality of analog distribution amplifiers 40, a plurality of trunk analog distribution amplifiers 45, a system head end 50 located at a cable system provider, a plurality of cable subscribers 60, a plurality of subscriber lines 62 and a plurality of subscriber equipment 64.

The trunk 20, the secondary trunks 25, the feeder lines 30, the secondary feeder lines 35 and the subscriber lines 62 use coaxial cable.

The analog distribution amplifiers (also called line extenders) 40 and the trunk analog distribution amplifiers 45 have a plurality of amplifier gain levels used to adjust the amount of amplification of each analog distribution amplifier 40 and each trunk analog distribution amplifier 45.

The subscriber equipment 64 is typically televisions (TV's), stereos and subscriber equipment capable of sending upstream traffic to the system head end 50 ("upstream subscriber equipment") such as pay-per-view descramblers and cable modems. The cable modems comprise first generation cable modems, second generation cable modems or both.

The secondary trunks 25 are connected to the trunk 20. The feeder lines 30 are typically connected to the secondary trunks 25 but may be connected directly to the trunk 20. The secondary feeder lines 35 are connected to the feeder lines 30. The subscriber lines 62 connect the cable subscribers 60 typically to the feeder lines 30 and the secondary feeder lines 35. Cable subscribers 60 are not typically connected to the trunk 20 or to the secondary trunks 25 (via the subscriber lines 62) except in some rural applications. The subscriber lines 62 are connected to the subscriber equipment 64.

The conventional cable (CATV) network 5 is primarily used to carry audio and video traffic (e.g. radio and television) using typically analog signals (but digital signals may be used) from the system head end 50 to the cable subscribers 60. The audio and video traffic is carried from the system head end 50, along the trunk 20, along the secondary trunks 25, along the feeder lines 30, along the secondary feeder lines 35, along the subscriber lines 62 to the subscriber equipment 64 (e.g. TV's) of the cable subscribers 60. The system head end 50 also,sends data traffic, using either analog or digital signals, through the cable (CATV) network 5 to the upstream subscriber equipment (e.g. data traffic instructing a pay-per-view descrambler to descramble a pay-per-view channel). In addition, data traffic may be sent from the system head end 50 using either analog or digital signals to virtually any part of the conventional cable (CATV) network 5 to control and fine tune the conventional cable (CATV) network 5. For example, the data traffic may be sent from the system head end 50 to adjust the amplifier gain level of any analog distribution amplifier 40 or any trunk analog distribution amplifier 45. (However, it is more common that the analog distribution amplifiers 40 and the trunk analog distribution amplifiers 45 self adjust based on pre-set reference levels). Any traffic sent from the system head end 50 is typically called downstream traffic.

The conventional cable network 5 also carries traffic to the system head end 50. For example, data traffic is carried from the upstream subscriber equipment to the system head end 50 through the cable (CATV) network 5 using either analog or digital signals (e.g. commands may be sent from the pay-per-view equipment in a subscriber's home or data traffic may be sent from the cable subscribers' 60 cable modems for Internet or other services). The data traffic is carried along the subscriber lines 62, along the secondary feeder lines 35, along the feeder lines 30, along the secondary trunks 25 and along the trunk 20 to the system head end 50. Any traffic sent to the system head end 50 is called upstream traffic.

The trunk analog distribution amplifiers 45 are used to boost the downstream traffic and the upstream traffic carried on the trunk 20 and the secondary trunks 25. The analog distribution amplifiers 40 are used to boost the downstream traffic and the upstream traffic carried on the feeder lines 30 and the secondary feeder lines 35. The trunk analog distribution amplifiers typically comprise a forward trunk analog amplifier (not shown) and a reverse trunk secondary analog amplifier (not shown). Similarly, the analog distribution amplifiers typically comprise a forward analog amplifier (not shown) and a reverse secondary analog amplifier (not shown). The forward trunk analog amplifier and the forward analog amplifier boost the downstream traffic. The reverse trunk secondary analog amplifier and the reverse secondary analog amplifier boost the upstream traffic.

Many conventional cable networks 5 comply with the Data-Over-Cable Interface Specification (DOCSIS) documents, (and specifically the Radio Frequency Interface Specification SP-RFI-104-980724) published on Jul. 24, 1998 by Cable Television Laboratories Inc. ("Cable Labs"). All the data-over-cable Interface Specification Documents are incorporated by reference herein.

Unfortunately, the analog distribution amplifies 40 and the trunk analog distribution amplifiers 45 introduce amplifier generated noise and signal distortion on the upstream traffic and the downstream traffic. The amplifier generated noise and signal distortion and any ingress noise from spurious sources all converge and accumulate at the system head end 50 along with any upstream traffic. The cumulative effect of the amplifier generated noise and signal distortion and the ingress noise limit the reliability and capacity of the cable (CATV) network 5 to carry upstream traffic. The amplifier generated noise and signal distortion introduced by the analog distribution amplifiers 40 and the trunk analog distribution amplifiers 45 and the ingress noise typically do not limit nearly as much the reliability and capacity of the conventional (CATV) network 5 to carry the downstream traffic since much of the amplifier generated noise and signal distortion and the ingress noise is distributed throughout the cable (CATV) network 5.

Figure 2:
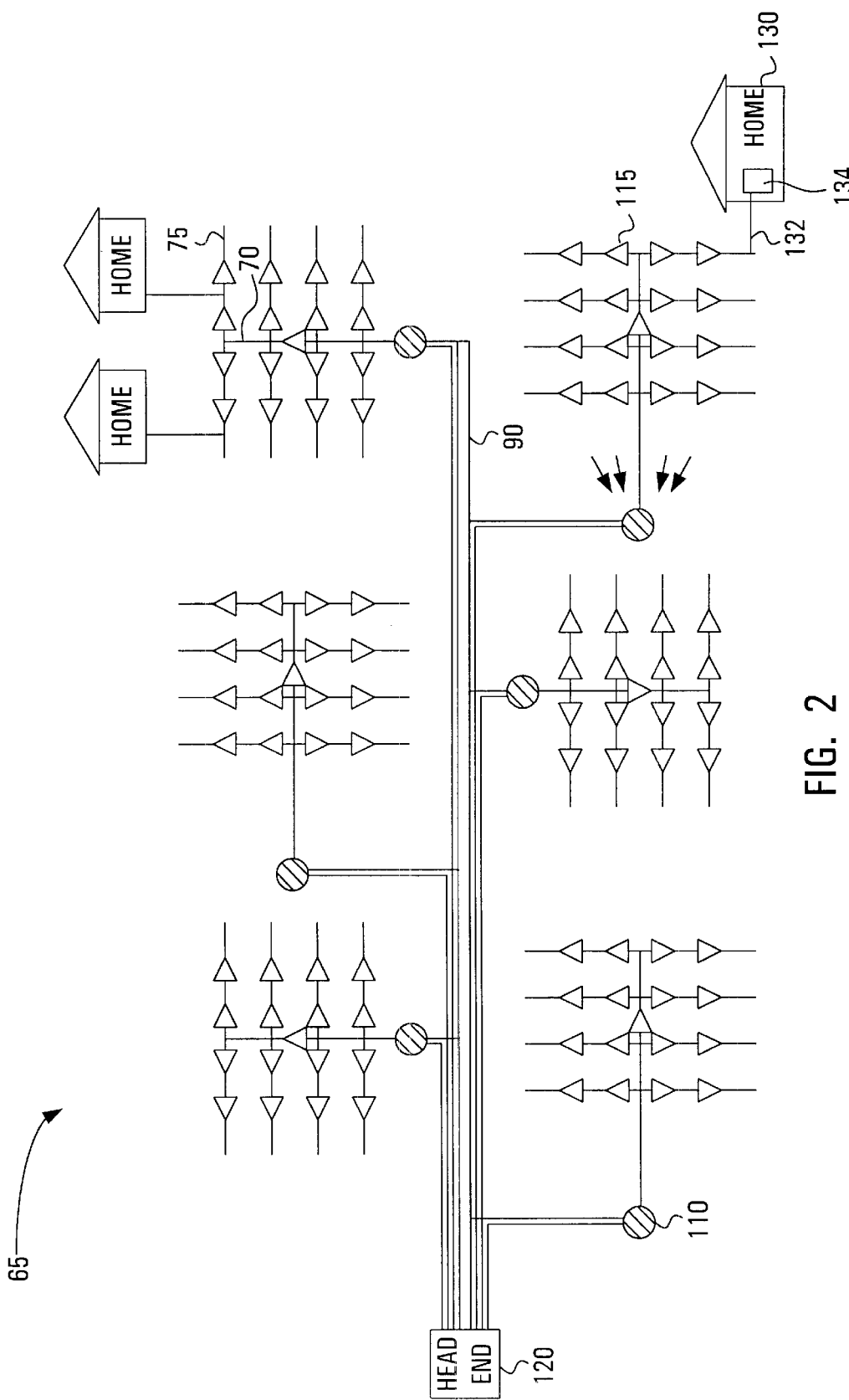
FIG. 2 is a network architecture diagram showing a conventional cable (CATV) network using a hybrid fibre-coax (HFC) architecture.

FIG. 2 shows another conventional cable (CATV) network 65 which consists of a plurality of feeder lines 70, a plurality of secondary feeder lines 75, a plurality of fibre trunks 90, a plurality of fibre nodes 110, a plurality of analog distribution amplifiers 115, a system head end 120, a plurality of cable subscribers 130, a plurality of subscriber lines 132 and a plurality of upstream subscriber equipment 134 (such as pay-per view descramblers and cable modems).

The feeder lines 70 are typically connected to the fibre trunks 90 via the fibre nodes 110. The secondary feeder lines 75 are connected to the feeder lines 70. The subscriber lines 132 connect the cable subscribers 130 to the feeder lines 70 and the secondary feeder lines 75 either directly or via the upstream subscriber equipment 134.

The fibre trunks 90 use fibre optic cable with many fibre strands within each fibre optic cable. Typically, a pair of strands are connected to each fibre node 110. The feeder lines 70, the secondary feeder lines 75 and the subscriber lines 132 use coaxial cable. The fibre nodes 110 are used to bridge the fibre optic cable used on the fibre trunks 90 with the coaxial cable used on the feeder lines 70. The fibre nodes 110 convert fibre optic signals carried on the fibre optic cable into radio frequency (RF) electromagnetic signals carried on the coaxial cable and vice versa. The analog distribution amplifiers 115 have a plurality of amplifier gain levels used to adjust the amount of amplification of each analog distribution amplifier 115.

The analog distribution amplifiers 115 typically are the same as the analog distribution amplifiers 40 shown in FIG. 1. That is, the analog distribution amplifiers typically comprise a forward analog amplifier (not shown) and a reverse secondary analog amplifier (not shown). The forward analog amplifiers are used to boost the downstream traffic and the reverse secondary analog amplifiers are used to boost the upstream traffic carried on the feeder lines 70 and the secondary feeder lines 75. The downstream traffic and the upstream traffic may use either analog or digital signals.

However, the analog distribution amplifiers 115 may introduce amplifier generated noise and signal distortion on the downstream traffic and the upstream traffic. In particular, the amplifier generated noise and signal distortion and any ingress noise from spurious sources all converge and accumulate at each respective fibre node 110 along with the upstream traffic. Finally, all the amplifier generated noise and signal distortion introduced by the analog distribution amplifiers 115 and all the ingress noise converge and accumulate at the system head end 120 (along with all the upstream traffic). However, very little ingress noise is picked up by the fibre trunks 90. In addition, since the fibre trunks 90 do not have amplifiers, the amount of amplifier generated noise and signal distortion is reduced in the conventional network 65 as compared with the conventional network 5 shown in FIG. 1. Since much of the ingress noise originates at or near the cable subscribers 130, much of the ingress noise is not fundamentally reduced in the conventional (CATV) network 65 as compared with the conventional (CATV) network 5 shown in FIG. 1, although improvements are realized since all the amplifier generated noise and signal distortion and all the ingress noise are divided over multiple fibre nodes 110. The cumulative effect of the amplifier generated noise and signal distortion and the ingress noise on the system head end limits the reliability and capacity of the conventional (CATV) network 65 to carry upstream traffic.

Figure 3:
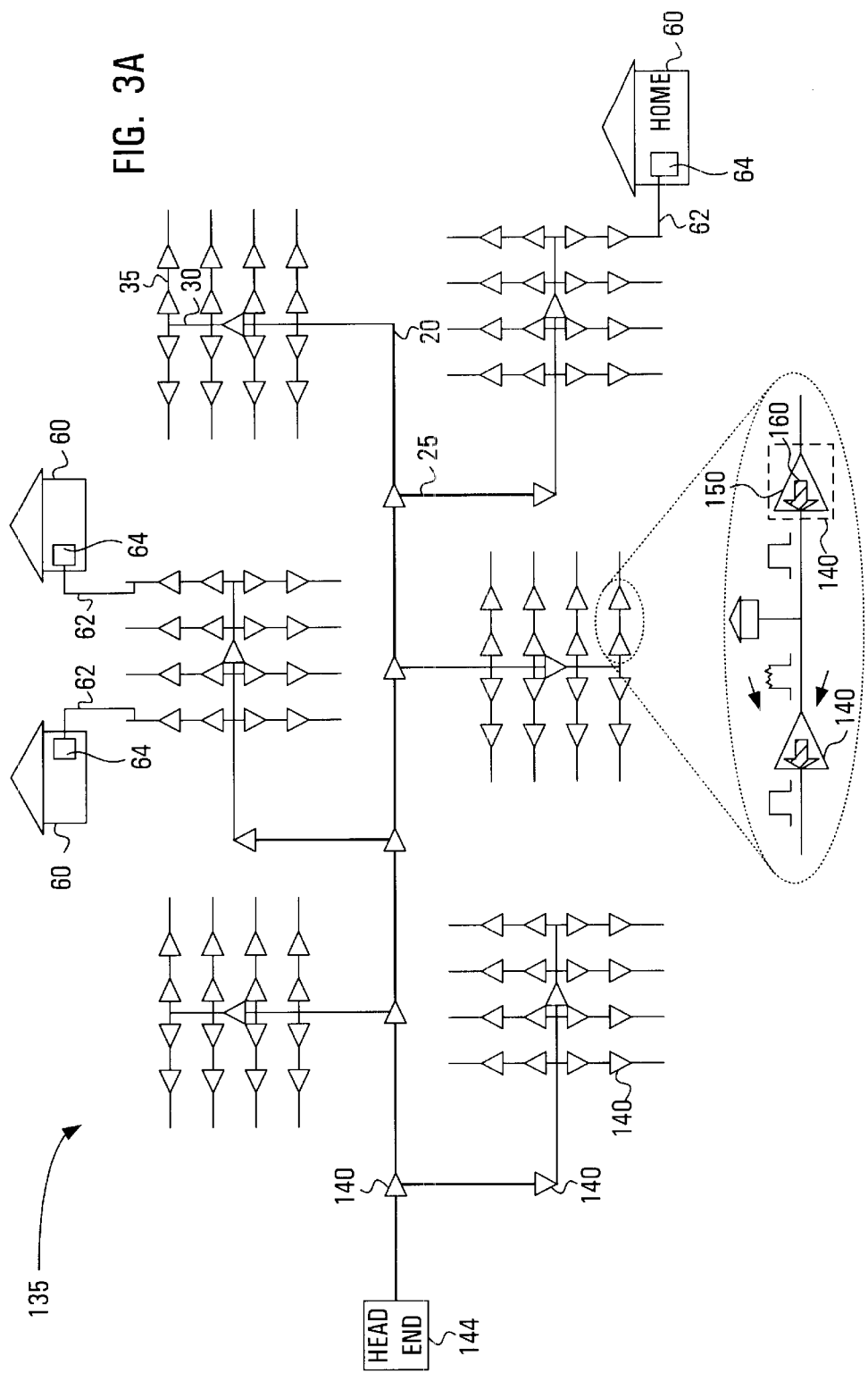
FIG. 3A is a network architecture diagram of cable (CATV) network in accordance with a preferred embodiment of the present invention.
FIG. 3B is simplified block diagram of a hybrid amplifier and regenerator device.

In accordance with a preferred embodiment of the present invention, FIG. 3A shows a cable (CATV) network 135 which is similar in configuration to cable (CATV) network 5 shown in FIG. 1. However, the plurality of the analog distribution amplifiers 40 and the trunk analog distribution amplifiers 45 in the cable (CATV) network 5 are replaced or upgraded with a plurality of hybrid amplifier and regenerator (HAR) devices 140. The system head end 50 is replaced or upgraded with a more sophisticated system head end—a system head end 144 (discussed in more detail later). In addition, some of the subscriber equipment 64 must be second generation cable modems (i.e. DOCSIS compliant).

Coaxial cable is used on the subscriber lines 62, the feeder lines 30, the secondary feeder lines 35, the trunk 20, the secondary trunks 25. (Alternatively, fibre optic cable can be used on the trunk 20 and on the secondary trunks 25 in which case a plurality of fibre nodes (not shown) are also used to connect the fibre optic cable on the trunk 20 and the secondary trunks 25 with the coaxial cable used on the feeder lines 30 and the secondary feeder lines 35. The fibre nodes convert fibre optic signals carried on the fibre optic cable into radio frequency (RF) electromagnetic signals carried on the coaxial cable and vice versa. Furthermore, when fibre optic cable is used on the trunk 20 and on the secondary trunks 25, the hybrid amplifier and regenerator (HAR) devices 140 are no longer needed on the trunk 20 and on the secondary trunks 25).

Figure 5:
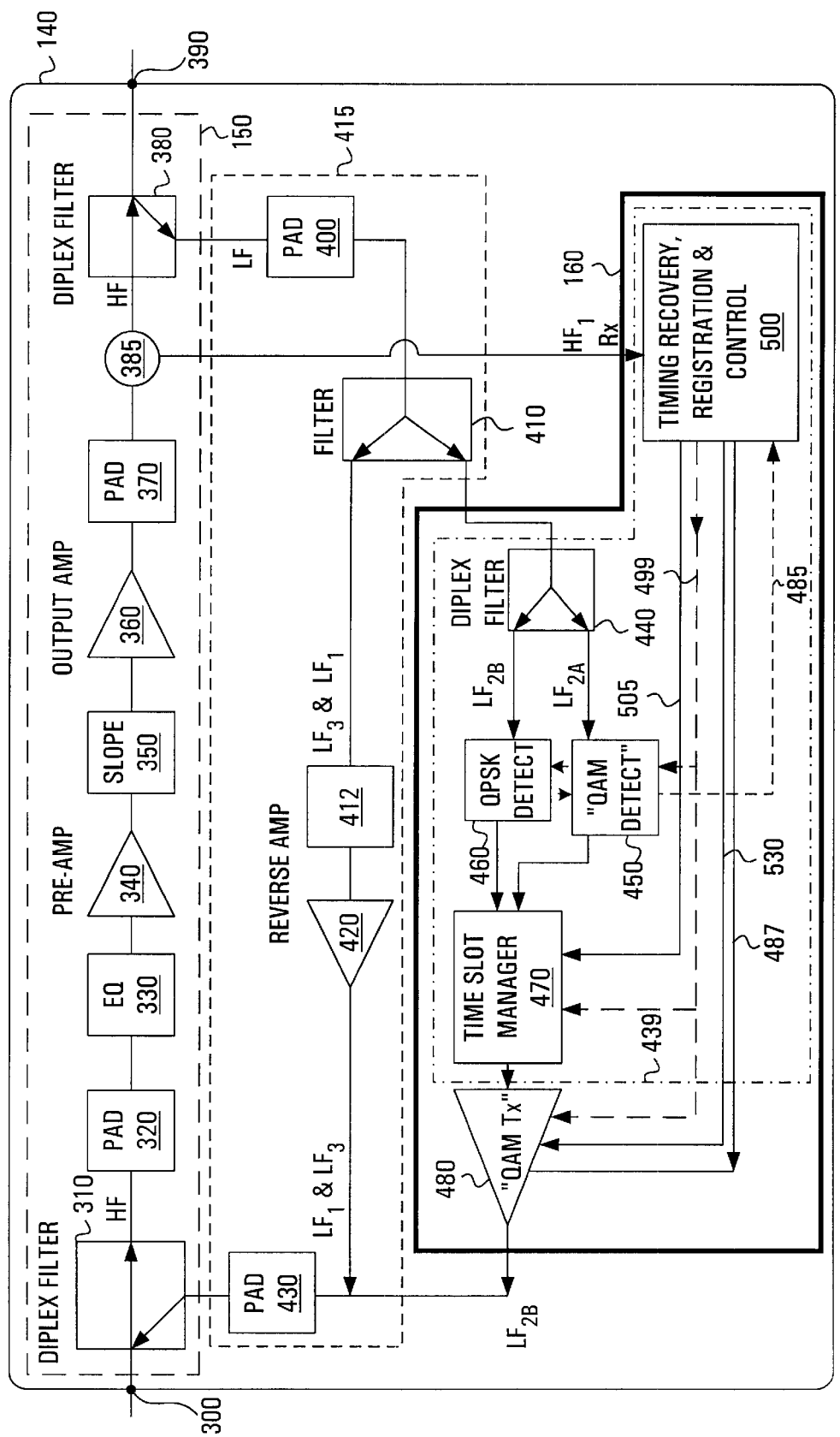
FIG. 5 is a block diagram of a hybrid amplifier and regenerator (HAR) device used in a preferred embodiment of the present invention.

Referring in particular to FIG. 3B and to FIG. 5, each hybrid amplifier and regenerator (HAR) device 140 comprises an analog amplifier 150 (sometimes called a downstream analog amplifier), a digital regenerator 160 (sometimes called an upstream digital regenerator) and an reverse secondary analog amplifier 415. Each analog amplifier 150 and each reverse secondary analog amplifiers 415 have a plurality of amplifier gain levels used to adjust the amount of amplification of the respective amplifier. Similarly, each digital regenerator 160 has a timing parameter and a plurality of signal levels. The timing parameters are used to ensure that the upstream traffic is sent at the correct time and phase and to ensure proper multiplexing (discussed in more detail later). The signal levels are necessary so that the level of the signal (for the upstream traffic) sent by the respective digital regenerator 160 may be adjusted.

Figure 4:
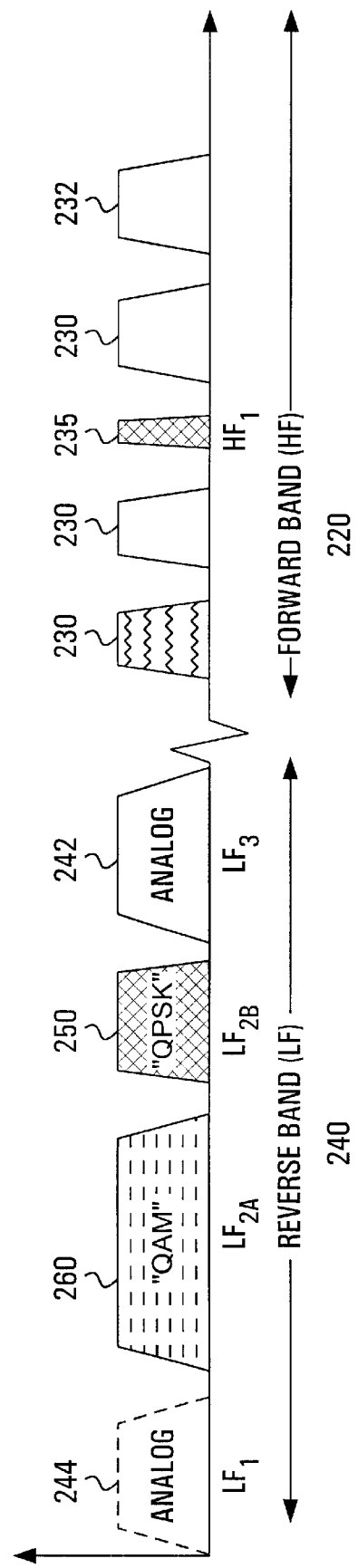
FIG. 4 is a frequency spectrum plan showing, inter alia, the ramp band and express band used in a preferred embodiment of the present invention.

Referring particularly to FIG. 4, downstream traffic from the system head end 144 is carried in a forward frequency band 220 to the cable subscribers 60. All upstream traffic to the system head end 144 is sent in a reverse frequency band 240 which is separate and apart from the forward frequency band 220. The forward frequency band 220 is above the reverse frequency band 240.

The reverse frequency band 240 and the forward frequency band 220 use conventional frequency bands. In North America and other locations of the world where NTSC standards are used, the reverse frequency band 240 is typically between 5 and 42 MHZ. The forward frequency band 220 is typically between 55 and up to 750 MHZ. Alternatively, different frequency ranges can be used for the forward frequency band 220 and the reverse frequency band 240.

The cable (CATV) network 135 carries three types of downstream traffic. The first type of downstream traffic primarily consists of audio, video, voice, data, control and other traffic for an older service or a plurality of older services such a television, pay-per-view television, radio or services using the first generation cable modems ("old cable modem based services"). An example of an old cable based service is Internet. The second type of downstream traffic primarily consists of audio, video, voice, data and other traffic for at service or a plurality of services using the second generation cable modems ("new cable modem based services"). Examples of new cable modem based services are telephony, Internet, multimedia and other data based services. The third type of downstream traffic primarily consists of data traffic used to maintain and fine tune the hybrid amplifier and regenerator (HAR) devices 140. For example, the third type of downstream traffic may be used to adjust the power levels of the analog amplifiers 150 and the reverse secondary analog amplifiers 415 but more suitably may be used to adjust the timing parameters and the signal levels of the digital regenerators 160. (It is more common that the analog amplifiers 150 and the reverse secondary analog amplifiers 415 self adjust based on pre-set reference levels).

Referring to FIG. 4, the first type of downstream traffic (for the older services such as television, radio and the old cable modem based services), is typically carried in separate broadcast channels 230 or other frequency bands which are part of the forward frequency band 220. The broadcast channels 230 and the other frequency bands are separate and apart from each other. Other than downstream traffic for the first generation cable modems, the first type of downstream traffic is typically sent to the cable subscribers 60 using analog signals (modulated on a plurality of analog carries using analog modulation techniques such as Amplitude Modulation (AM) and Frequency Modulation (FM)). Alternatively, some or all of the first type of downstream traffic for the older services can be sent using digital signals (modulated on a plurality of analog carriers using digital modulation techniques such as Quadrature Phase Shift Keying (QPSK) and Quadrature Amplitude Modulation (QAM)). The first type of downstream traffic for the first generation cable modems are typically sent using digital signals (modulated on a plurality of analog carriers using digital modulation techniques such as Quadrature Phase Shift Keying (QPSK) and 64 Quadrature Amplitude Modulation (QAM)).

The second type of downstream traffic destined to cable subscribers 60 for the new cable modem based services such as telephony, Internet, multimedia and other data services is carried in a cable modem transmission band 232 which is part of the forward band but separate and apart from the broadcast channels and the other frequency bands in the forward band 220. Alternatively, the second type of downstream traffic destined to the cable subscribers 60 for the new cable modem based services can also be carried in the broadcast channels 230 or in the other frequency bands in the forward frequency band 220. The second type of traffic of downstream traffic is also be used to synchronize/align the second generation cable modems in the cable (CATV) network 135. The second general type of downstream traffic is sent using digital signals modulated on an analog carrier or a plurality of analog carriers using 64 Quadrature Amplitude Modulation (64 QAM). Alternatively, other digital modulation techniques, such as 256 Quadrature Amplitude Modulation (256 QAM) can be used. The type of modulation technique chosen depends on the type of the second generation cable modem being used. The speed of the digital second type of downstream traffic downstream traffic is between 30 and 40 Megabits per second. (Alternatively, other speeds can be used).

The third type of downstream traffic is typically sent from the system head end 144 through one or more hybrid amplifier and regenerator (HAR) devices 140, on a downstream control and timing tone band 235. The downstream control and timing tone band 235 is also part of the forward frequency band 220 but is separate from the broadcast channels 230, the other frequency bands in the forward band and the cable modem transmission band 232. The third type of downstream traffic is modulated on a downstream control and timing tone (or carrier) of a fixed frequency using Amplitude Modulation (AM) with less than 100% modulation to ensure reliable carrier recovery. Alternatively, any other analog modulation technique that does not alter the fixed frequency can be used on the downstream control and timing tone. Alternatively, a plurality of downstream control and timing tones can be used to carry the third type of downstream traffic.

The cable (CATV) network 135 carries three types of upstream traffic. The first type of upstream traffic is upstream traffic sent by the cable subscriber(s) 60 to the system head end 144 by the upstream subscriber equipment for the older services including the old cable modem based services (e.g. upstream traffic from the pay-per-view descramblers and the first generation cable modems). The first type of upstream traffic is primarily data traffic.

The second type of upstream traffic is upstream traffic sent by the cable subscriber(s) 60 using the second generation cable modems to the system head end 144 for the new cable modem based services such as telephony, Internet, multimedia and other data based services. The second type of upstream traffic primarily consists of audio, video, data and other traffic.

The third type of upstream traffic is traffic not sent by cable subscriber(s) 60 to the system head end 144. The third type of upstream traffic primarily consists of data traffic from virtually any part of the cable (CATV) network 135 to the system head end 144 for purposes such as monitoring the performance and status of the cable (CATV) network 135 and for maintaining the cable (CATV) network 135. For example, the third type of upstream traffic can be used to provide information to the system head end 144 for use in controlling aligning, synchronizing and fine tuning the hybrid amplifier and regenerator (HAR) devices 140.

The first type of upstream traffic is typically carried in the cable (CATV) network 135 using digital signals modulated on an analog carrier or a plurality of analog carriers within a first general upstream band 242 and a second general upstream band 244 using FSK, PSK, QPSK or QAM. The first general upstream band 242 and the second general upstream band 244 are separate and apart from each other. Both the first general upstream band 242 and the second general upstream band 244 are within the reverse frequency band 240. The first general upstream band 242 is located above 30 MHZ (and is below the forward frequency band 220). The second general upstream band 244 is located below 10 MHZ. Alternatively, one general upstream band or more than two general upstream bands can be used to carry the first type of upstream traffic. Collectively, the first general upstream band 242 and the second general upstream band 244 are called general upstream bands. Alternatively, the first general upstream band 242 and the second general upstream band 244 may be located in different parts of the reverse band 240.

Alternatively, the first type of upstream traffic may be carried in the cable (CATV) network 135 using analog signals or may include analog signals modulated on a analog carrier or a plurality of analog carriers within the first general upstream band 242 and/or the second general upstream band 244 using analog modulation techniques such as AM or frequency. modulation (FM).

There are typically two sub-types of the second type of upstream traffic—ramp band traffic and express band traffic. The ramp band traffic is the second type of upstream traffic carried in a ramp band 250. The ramp band 250 is part of the reverse frequency band 240. The express band traffic is the second type of upstream traffic carried in an express band 260. The express band 260 is also part of the reverse frequency band 240 and is in a separate frequency band either above or below the ramp band 240. Both the ramp band 250 and the express band 260 are typically located below the first general upstream band 242 and above the second general upstream band 244. As discussed in more detail below, the ramp band traffic from each second generation cable modem is merged or multiplexed into the express band traffic.

In North America, the ramp band 250 is between 25 MHZ and 42 MHZ and the express band 260 is between 5 MHZ and 25 MHZ. The bandwidth of the ramp band 250 and the positioning of the ramp band 250 in the frequency spectrum is determined according to the DOCSIS specifications of the second generation cable modem being used by the cable subscribers 60 to generate the ramp band traffic. Alternatively, the express band may be located in a different part of the reverse band 240.

The ramp band traffic is carried in the cable (CATV) network 135 using digital signals modulated on a ramp band carrier using Quadrature Phase Shift Keying (QPSK). Other digital modulation techniques can be used such as Quadrature Amplitude Modulation (QAM). The ramp band carrier is an analog carrier located within the ramp band 250. The speed of the ramp band traffic is 640 Kbits/sec. Other speeds between 320 Kbits/sec to 10 Mbits/sec can be used. A ramp band transmission is ramp band traffic modulated on the ramp band carrier.

The express band traffic is carried in the cable (CATV) network 135 in a plurality of data frames using digital signals modulated on an express band carrier using 64 quadrature amplitude modulation (64 QAM). Other digital modulation techniques can be used such as Quadrature Phase Shift Keying (QPSK) or 16 or 256 Quadrature Amplitude Modulation (16 or 256 QAM). The express band carrier is an analog carrier located within the express band 260 and is an integral sub-multiple of the downstream control and timing tone (or carrier). The speed of the express band traffic is between 10 Mbits/sec to 40 Mbits/sec. Other speeds can be used. The speed of the express band traffic is higher than the speed of the ramp band traffic. An express band transmission is express band traffic modulated on the express band. The express band traffic is carried in a plurality of virtual channels. One of the virtual channels is a maintenance channel (discussed in more detail later).

The general upstream bands (242 and 244) are also capable of carrying the second type of upstream traffic. For example, if the digital regenerators 160 have failed, the system head end 144 would likely bypass (or turn off) the digital regenerators 160 and instruct the second generation cable modems to transmit in the general upstream bands (242 and 244).

The third type of upstream traffic, typically used by the system head end 144 to control and fine tune hybrid amplifier and regenerator (HAR) devices 140 and the second generation cable modems is carried within the maintenance channel using the same modulation technique used for the other virtual channels (e.g. 64 QAM). Alternatively, the third type of upstream traffic is carried in a plurality of maintenance channels (each maintenance channel is a virtual channel in the express band). Alternatively, the third type of upstream traffic can be carried in one or more of the general upstream bands (such as the first general upstream band 242 or the second general upstream band 244). When the third type of upstream traffic is carried in one or more of the general upstream bands, the third type of upstream traffic is typically carried using digital signals modulated on analog carriers using digital modulation techniques such as Quadrature Phase Shift Keying (QPSK) or 64 Quadrature Amplitude Modulation (64 QAM). (Alternatively, other digital modulation techniques can be used).

The upstream traffic carried to the system head end 144 using analog signals is typically called analog upstream traffic. The upstream traffic carried to the system head end 144 using digital signals is typically called digital upstream traffic. Similarly, the downstream traffic carried from the system head end 144 using analog signals is typically called analog downstream traffic. The downstream traffic carried from the system head end 144 using digital signals is typically called digital downstream traffic.

The analog amplifiers 150 in the hybrid amplifier and regenerator (HAR) devices 140 are used to boost the first, the second and the third type of downstream traffic carried on the trunk 20, the secondary trunks 25, the feeder lines 30 and the secondary feeder lines 35. As mentioned earlier, the downstream traffic is sent using either analog signals or digital signals or both (i.e. analog downstream traffic and digital downstream traffic) modulated on a plurality of analog carriers.

The reverse secondary analog amplifiers 415 in the hybrid amplifier and regenerator (HAR) devices 140 are used to boost the first type of upstream traffic carried on the first general upstream band 242 and the second general upstream band 244. As mentioned earlier the first type of upstream traffic carried on the first general upstream band 242 and the second general upstream band 244 is sent typically using digital signals (but analog signals can be used). Furthermore, the third type of upstream traffic carried on the general upstream bands, if any, is amplified typically by the reverse secondary analog amplifiers 415 in the hybrid amplifier and regenerator devices 140.

The digital regenerators 160 in each hybrid amplifier and regenerator (HAR) device 140 are used to regenerate and transmit the third type of upstream traffic (carried in the maintenance channel of the express band 260) and the second type of upstream traffic to the system head end 144. The digital regenerators 160 help reduce noise and signal distortion on the upstream traffic.

The enhanced head end 144 has reception (i.e. receivers) and transmission equipment (i.e. transmitters). The enhanced head end 144 supplements traditional head-end processing for traditional applications (such as audio and video) and that of the older services (including old cable modem based services) with processing for new cable modem based services. In particular, the enhanced head-end 144 has additional control, managing and receiving equipment for interaction with the Hybrid amplifier and regenerator (HAR) devices 140, especially for interaction with the digital regenerators 160 within the Hybrid amplifier and regenerator (HAR) devices 140. The control, managing and receiving equipment is able to address each Hybrid amplifier and regenerator (HAR) device 140, control the relative phase and amplitude of the express band transmissions sent from each Hybrid amplifier and regenerator (HAR) device 140 and assign the individual ramp band traffic to a unique virtual channel in the express band. The enhanced head end 144 also demultiplexes the express band traffic into multiple ramp band traffic and demultiplexes the ramp band traffic into data traffic from each second generation cable modem. ("cable modem traffic").

The enhanced head end 144 also maintains a time slot allocation map which keeps track of time slots assigned to individual second generation cable modems. A copy of the time slot allocation map is sent by the head end 144 to all the second generation cable modems. Each second generation cable modem has a unique identifier number. Each second generation cable modem reads the time slot allocation map and in particular reads the data in the time slot allocation map corresponding to the identifier number of the respective second generation cable modem. After reading the time slop allocation map, each cable modem transmits data within its designated time slot. It should be noted that the same time slot can be reused by another second generation cable modem in a different feeder line 30 or secondary feeder line 35 of the network 135 that maps into a different virtual channel of the express band 260. In other words, two or more second generation cable modems could be assigned to transmit at exactly the same time on the same ramp band 250 if the second generation cable modems are located in different feeder lines 30 or secondary feeder lines 35 and their respective ramp band traffic is mapped into different virtual channels of the express band 260.

The time slot allocation map also contains the carrier frequency of the ramp band 250, the modulation format (e.g. QPSK) and the speed (e.g. 640 Kbits/sec).

A second time slot allocation map maintains a plurality of second time slots in other bands which are part of the first general upstream band 242 or the second general upstream band 244. The second time slots are typically assigned to first generation cable modems. However, as previously mentioned, the second time slots may also be assigned to second generation cable modems (e.g. If the digital regenerators 160 have failed, the second generation cable modems may be assigned to transmit in the general upstream bands (242 and 244) during the respective second time slot as specified by the second time slot allocation map).

If multiple ramp bands 250 are used (discussed in more detail later), the head end 144 keeps a frequency/time slot allocation map which keeps track of specific time slots and frequencies assigned to individual second generation cable modems.

The second generation cable modems receives the second type of downstream traffic on the downstream cable modem transmission band 232. In particular, the second generation cable modems demodulate transmissions from the system head end 144 on the cable modem transmission band 232. In addition, the second generation cable modems modulate the ramp band traffic on the ramp band 250 from the cable subscribers 60. In particular, the second generation cable modems modulate the ramp band carrier with the second type of digital upstream traffic from the cable subscribers 60 using QPSK in order to generate and send the ramp band traffic (via ramp band transmissions). Any analog upstream traffic (e.g. telephony) from the cable subscribers 60 is first digitized by a plurality of conversion devices (such as an analog to digital converters (A/D converters)) external from the second generation cable modems. (Alternatively, conversion devices internal to the second generation cable modems can be used). Then, the second generation cable modems modulate the ramp band carrier with the digital upstream traffic from the conversion devices in order to generate and send the ramp band traffic. Each second generation cable modem has a timing parameter and a plurality of signal levels. In addition, each second generation cable modems can operate on a plurality of frequencies (i.e. the frequency of the ramp band carrier can be adjusted).

As mentioned earlier, each hybrid amplifier and regenerator (HAR) device 140 comprises an analog amplifier 150, a reverse secondary analog amplifier 415, and a digital regenerator 160. Referring to FIG. 5, the analog amplifier 150 comprises a diplex filter 310, an attenuation pad 320, an equalizer 330, a pre-amplifier 340, a slope compensator 350, an output amplifier 360, an attenuation pad 370 and a diplex filter 380. The reverse secondary analog amplifier 415 comprises an attenuation pad 400, a triplex filter 410, an equalizer 412, an analog amplifier 420 and an attenuation pad 430. The digital regenerator 160 comprises mapping circuitry 439 and an express band transmitter 480. It should be noted that the hybrid amplifier and regenerator (HAR) device 140 can be considered as being formed by adding a digital regenerator 160 to a conventional amplifier comprising the analog amplifier 150 and the reverse secondary analog amplifier 415. The digital regenerator 160 can be put on a daughter board which can be connected to the conventional amplifier.

All downstream traffic from the system head end 144 enters the hybrid amplifier and regenerator (HAR) device 140 at I/O point 300 and arrives at the diplex filter 310. The diplex filter 310 only allows the passage of downstream traffic carried in the forward frequency band 220 to the attenuation pad 320. The attenuation pad 320 is adjusted to attenuate the downstream traffic so as to prevent the overloading of the pre-amplifier 340. The downstream traffic is carried from the attenuation pad 320 to the equalizer 330. Since downstream traffic carried in higher frequencies tend to lose more signal strength than downstream traffic carried in lower frequencies, the equalizers 330 helps to equalize the signal strength of the lower frequencies and the higher frequencies by attenuating the lower frequencies. The downstream traffic from the equalizer 330 is amplified by the pre-amplifier 340 and carried to the slope compensator 350. Since the pre-amplifier 340 provides equal amplification to the higher frequencies and the lower frequencies, the slope compensator 350 helps to emphasize the signal strength of the higher frequencies by attenuating the lower frequencies. Downstream traffic from the slope compensator 350 is amplified by the amplifier 360 and carried to the attenuation pad 370. Attenuation pad 370 is adjusted so as to attenuate the downstream signals to help prevent overloading equipment used by a cable subscriber 60 or another hybrid amplifier and regenerator (HAR) device 140 located downstream. The downstream traffic passes through the diplex filter 380 to an input/output point 390. At a point 385 just before the diplex filter 380, the third type of downstream traffic carried on the downstream control and timing tone band 235 is carried to a control unit 500 (discussed in more detail below).

All upstream traffic carried in the reverse frequency band 240 enters the hybrid amplifier and regenerator (HAR) device 140 at the input/output point 390 and is separated from any downstream traffic in the forward frequency band by the diplex filter 380 and is carried to the attenuation pad 400. The attenuation pad 400 is adjusted to attenuate the analog and digital upstream traffic so as to prevent the overloading of the digital regenerator 160 and the analog amplifier 420. The upstream traffic is then carried to the triplex filter 410. The triplex filter 410 separates the upstream traffic carried on the first general upstream band 242 and the second general upstream band; 244 from the traffic carried on the ramp band 250 and the express band 260. (If either the first general upstream band, 242 or the second general upstream band 244 is not used, the triplex filter 410 is replaced with a diplex filter. The diplex filter separates the upstream traffic carried on either the first general upstream band 242 or the second general upstream band 244 from the upstream traffic carried on the ramp band 250 and the express band 260). The upstream traffic carried on the first general upstream band 242 and the second general upstream band 244 is carried from the triplex filter 410 to the equalizer 412. Since upstream traffic carried in higher frequencies tend to lose more signal strength than downstream traffic carried in lower frequencies, the equalizer 412 helps to equalize the signal strength of the lower frequencies and the higher frequencies by attenuating the lower frequencies. The upstream traffic is then carried from the equalizer 412 to the analog amplifier 420. The analog amplifier 420 amplifies the analog upstream traffic. The analog upstream traffic is then carried to the attenuation pad 430. The attenuation pad 430 is adjusted to attenuate the analog upstream traffic and the digital upstream traffic so as to prevent the overloading of any hybrid amplifier and regenerator (HAR) devices 140 upstream.

The upstream traffic carried on the ramp band 250 and the express band 260 is carried from the triplex filter 410 to the digital regenerator 160. In particular, the upstream traffic carried on the ramp band 250 and the express band 260 is carried from the triplex filter 410 to the mapping circuitry 429. Mapping Circuitry 439 consists of the diplex filter 440, an express band receiver 450, a ramp band receiver 460, a time slot manager 470 and the control unit 500. In particular, the upstream traffic carried on the ramp band 250 and the express band 260 is carried from the triplex filter 410 to the diplex filter 440. The diplex filter 440 separates the upstream traffic carried on the ramp band 250 from the traffic carried on the express band 260. The upstream traffic carried on the express band 260 and the upstream traffic carried on the ramp band 250 is carried separately to the express band receiver 450 and the ramp band receiver 460 respectively. The ramp band receiver 460 detects and converts the digital signals carried on the ramp band 250 into a ramp band Bitstream. Similarly, the express band receiver 450 detects and converts the digital signals carried on the express band 260 into an express band Bitstream. (In particular, the express band detector 450 and the ramp band detector 460 typically detect the phase and amplitude of the ramp band carrier and the express band carrier respectively in order to detect and convert the digital signals carried on the ramp band 250 and the express band 260 respectively). The upstream traffic carried in the express band 260 from the express band detector 450 and the upstream traffic carried in the ramp band 250 from the ramp band detector 460 is carried to the time slot manager 470. The time slot manager 470 maps the ramp band traffic carried on the ramp band 250 into the express band traffic carried on the express band 260 using digital time division multiplexing (discussed in more detail later). In order to co-ordinate the digital time division multiplexing, the control unit 500 sends a time slot control signal on a time slot control line 505. The upstream traffic carried on the express band 260 is then carried from the time slot manager 470 to the express band transmitter 480. The express band transmitter 480 modulates the express band carrier with the express band traffic from the time slot manager 470. The upstream traffic from the express band transmitter 480 is then carried to the attenuation pad 430. The analog upstream traffic and the digital upstream traffic is then carried from the attenuation pad 430 through the diplex filter 310 and through the input/output point 300.

As discussed in more detail later, for the network 135 to operate, correctly, it is necessary for each Hybrid amplifier and regenerator (HAR) device 140 to send its express band traffic at a certain phase and amplitude. If a Hybrid amplifier and regenerator (HAR) device 140 is misaligned (the misaligned HAR 140"), the Hybrid amplifier and regenerator (HAR) device 140 upstream from the misaligned HAR 140 will receive express band traffic with an incorrect phase and/or amplitude ("a level or a phase error"). The express band detector 450 of the upstream Hybrid amplifier and regenerator (HAR) device 140 sends an error detect signal to the control unit 500 on error detect line 485. The control unit 500 informs the system head end 144 of the level or the phase error by sending the third type of upstream traffic in the maintenance channel of the express band 260. This upstream traffic is carried on line 487 to the express band transmitter 480, through the attenuation pad 430, through the diplex filter 310, through input/output point 300, through other hybrid amplifier and regenerator (HAR) devices 140, if any, and finally to the system head end 144. The system head end 144 sends the third type of downstream traffic in the downstream control and timing tone band 235 through one or more hybrid amplifier and regenerator (HAR) devices 140, if any, to the misaligned hybrid amplifier and regenerator (HAR) device 140. The downstream traffic sent by the system head end 144 will cause a revision of the amplitude or phase of the express band traffic sent by the misaligned hybrid amplifier and regenerator (HAR) device. This process iterates until the level or phase error is eliminated or reduced to negligible levels.

In particular, in response to the third type of downstream traffic sent by the head end 144, the misaligned Hybrid amplifier and regenerator (HAR) device 140 changes the phase or amplitude of the express band traffic by sending a signal from the control unit 500 along an express band control line 530 to the express band transmitter 480 to adjust the amplitude or phase of the express band transmission.

As discussed later, if a hybrid amplifier and regenerator device (HAR) 140 ("the upstream HAR") detects that the digital multiplexing performed by another Hybrid amplifier and regenerator (HAR) device 140 downstream ("the downstream HAR") is incorrect, the control unit 500 in the upstream HAR 140 informs the system head end 144 of the problem by sending a third type of upstream traffic in the maintenance channel of the express band 260. The upstream traffic is carried on line 487 to the express band transmitter 480, through the attenuation pad 430, through the diplex filter 310, through the input/output point 300, through other hybrid amplifier and regenerator (HAR) devices 140, if any, and finally to the system head end 144. The system head end 144 sends the third type of downstream traffic in the downstream control and timing tone band 235 through one or more hybrid amplifier and regenerator (HAR) devices 140, if any, to the downstream misaligned HAR 140. The downstream traffic is received by the control unit 500 in the downstream HAR 140. The control unit 500 sends a signal from the time slot control line 505 to the time slot manager 470 to correct the problem (as discussed in more detail later).

The downstream control and timing tone (or carrier) provides the timing reference to all the hybrid amplifier and regenerator (HAR) devices 140 in the cable (CATV) network 135 on the downstream control and timing tone band 235. In particular, the control unit 500 in each hybrid amplifier and regenerator (HAR) device 140 has an integer divider circuit, not shown. The control unit 500 receives the downstream control and timing tone and detects and sends the timing reference into the integer divider circuit and out on clock out lines 499 to the express band detector 450, the ramp band detector 460, the time slot manager 470 and the express band transmitter 480.

Similarly, if either the amplitude or frequency of the ramp band traffic received by a Hybrid amplifier and regenerator (HAR) device 140 from a second generation cable modem ("the misaligned cable modem") is incorrect ("a level or a frequency error"), the ramp band detector 460 of the HAR 140 sends an error detect signal to the control unit 500 on error detect line 485. The control unit 500 informs the system head end 144 of the level or the frequency error by sending the third type of upstream traffic in the maintenance channel of the express band 260. This upstream traffic is carried on line 487 to the express band transmitter 480, through the attenuation pad 430, through the diplex filter 310, through input/output point 300, through other hybrid amplifier and regenerator (HAR) devices 140, if any, and finally to the system head end 144. The system head end 144 sends the second type of downstream traffic in the cable modem transmission band 232 through one or more hybrid amplifier and regenerator (HAR) devices 140, if any, to the misaligned second generation cable modem. The downstream traffic sent by the system head end 144 will cause a revision of the amplitude or frequency of the ramp band traffic. This process iterates until the level or phase error is eliminated or reduced to negligible levels.

Figure 6:
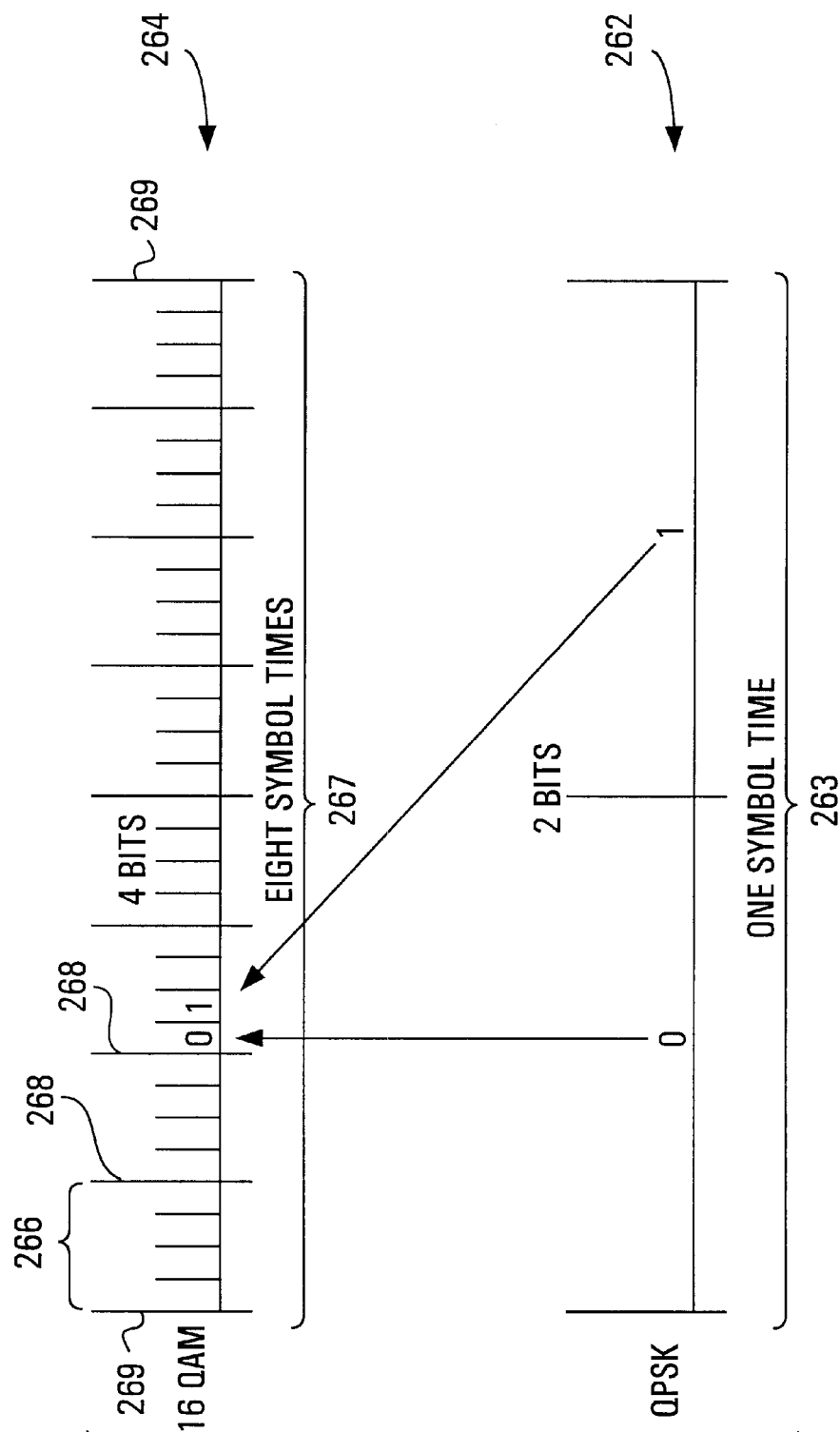
FIG. 6 is a diagram showing the mapping from the ramp band to the express band used in a preferred embodiment of the present invention.

Referring in particular to FIG. 6, the ramp band receiver 460 in each digital regenerator 160 detects the digital signals carried in the ramp band 250 and converts them into a ramp band Bitstream 262. The ramp band Bitstream 262 consists of a series of digital bits (i.e. either a 0 or a 1). Similarly, the express band receiver 450 in each digital regenerator 160 detects the digital signals carried in the express band 260 and converts them into an express band Bitstream 264. The express band Bitstream 264 also consists of a series of digital bits.

As mentioned earlier, the ramp band traffic is modulated on a ramp band carrier using the QPSK modulation technique. Two bits can constitute one ramp band symbol 263 in QPSK. The express band traffic is modulated on an express band carrier using the 64 QAM modulation technique. For the sake of simplicity, FIG. 6 illustrates 16 QAM. In 16 QAM, 4 bits constitute one express band symbol 266. Furthermore, in 16 QAM, 8 symbols constitute an express band data frame 267. If a different modulation scheme was used, the number of bits constituting an express band symbol and the number of symbols constituting the express band data frame may be different. Each express band symbol 266 have express band symbol boundaries 268. Similarly, each express band data frame 267 have express band data frame boundaries 269. Each express band data frame boundary 269 is also an express band symbol boundary 268. Similarly, each ramp band symbol 263 has ramp band symbol boundaries.

The ramp band traffic is mapped (or multiplexed) into the express band traffic by the time slot manager 470 in each digital regenerator 160. In particular, the ramp band traffic is converted into express band traffic by mapping each ramp band symbol 263 into a precise location in each data frame of the express band Bitstream 264 using digital time division multiplexing. (Typically each ramp band symbol 263 is mapped into a portion of one of the express band symbols 266 as shown in FIG. 6). The precise location is one of the virtual channels of the express band 260. The resulting express band traffic is modulated on the express band carrier by the express band transmitter 480 using 64 QAM.

It should be noted that all ramp band transmissions from the second generation cable modems are transmitted in packets (in bursts) within time slots according to the time slot allocation map. Each burst packet begins with a specified preamble sequence which allows the ramp band receiver to properly acquire the carrier frequency and phase of the ramp band and to determine the symbol boundary of the first ramp band symbol. In general, some of the preamble sequence is multiplexed into the express band 260 where they can be used to detect the boundary of the first ramp band symbol in a burst packet.

In reference to the above, persons skilled in the art would appreciate that a QPSK symbol represents 2 bits, whereas a 64 QAM symbol represents 8 bits in 1/32 the duration. In other words, 32 64 QAM symbols each representing 8 bits, can be sent in the same amount of time as a single QPSK symbol representing only 2 bits. Thus, it should be clear that the data rate or the 64 QAM sequence (i.e. in the express band) is 128 (=32 [64 QAM symbols]×8 [bits/64 QAM symbol]×½ [QPSK symbol/bit]) times greater than the data rate of the QPSK sequence (i.e. in the ramp band). Thus, simply put, an express band transports upstream traffic at a substantially higher data rate as compared to any ramp band so that upstream traffic originating from a number of sources can be aggregated from multiple ramp bands into an express band.

Given, as an example for the sake of simplicity, in reference to FIG. 6 is the illustration representing the mapping from a QPSK ramp band to a 16 QAM express band. Shown in FIG. 6, there arc eight 16 QAM symbols, each representing 4 bits, sent in the same amount of time as a single QPSK symbol in the ramp band. In fact, the data from the QPSK symbols in the ramp band is mapped into the 16 QAM symbols (in reality it is preferably into 64 QAM symbols) in the express band. Again, those skilled in the art would appreciate that the mapping of data from the QPSK ramp band into the example 16 QAM express band results in a 16 fold increase in the rate at which data is transmitted.

With frequently placed regenerators in the cable (CATV) network 135, reliable and high capacity upstream transmissions can be accomplished. Noise on the express band 260 is typically cleaned out by each regenerator provided that the noise has not generated a bit error. The upstream traffic on the express band 260 is transmitted anew on the express band 260 by each regenerator. Furthermore, the digital time division multiplexing prevents any noise in the ramp band from affecting the upstream traffic previously mapped into the express band using digital time division multiplexing.

The hybrid amplifier and regenerator (HAR) devices 140 with the digital regenerators 160 are located in the cable (CATV) network 135 at intervals sufficiently closely spaced to overcome the attenuation of the upstream traffic and the downstream traffic. Typically, the hybrid amplifier and regenerator (HAR) devices 140 are spaced 500 to 1000 feet or less apart respectively. (It should be noted that the intervals are engineering parameters and depend on the bandwidth of the system, cable size and loss, amplifier gain, etc.).

In addition to the multiplexing which happens from the ramp band 250 to the express hand 260, there is multiplexing of the digital upstream traffic on the express band 260 whenever multiple hybrid amplifier and regenerator (HAR) devices 140 transmit upstream traffic to a single hybrid amplifier and regenerator (HAR) device as shown in FIG. 7A. FIGS. 7A and 7B illustrate two upstream transmissions from a hybrid amplifier and regenerator (HAR) device A (600) and a hybrid amplifier and regenerator (MAR) device B (610) converging on a hybrid amplifier and regenerator (HAR) device C (620). Each upstream transmission has a duration. Referring to FIGS. 7A and 7B, it is necessary that digital upstream traffic 650 tom the hybrid amplifier and regenerator (HAR) device A (600) and digital upstream traffic 660 from the hybrid amplifier and regenerator (HAR) device B (610) arrive at Me hybrid amplifier and regenerator (HAR) device C (620) at a certain time for correct operation. As mentioned earlier, the head end 144 sends the third type of downstream traffic on the downstream control and timing tone band 235 to correct the amplitude and/or phase (or timing) of the express band transmissions from any misaligned hybrid amplifier and regenerator (HAR) device 140.

In order to ensure the needed fine level of control, the express band carrier is an integral sub-multiple of the downstream control and timing tone (or carrier). In conjunction with the system head end 144 (as discussed earlier), the control units 500 from the hybrid amplifier and regenerator (HAR) device A (600) and the hybrid amplifier and regenerator (HAR) device B (610) send the digital upstream traffic 650 and the digital upstream traffic 660 at certain signal crossings of the downstream control and timing tone. Referring to FIG. 7B, the hybrid amplifier and regenerator (HAR) device A (600) finishes transmitting a symbol at a signal crossing 662 and the hybrid amplifier and regenerator (HAR) device B (610) must start sending the next symbol a short time later at a signal crossing 664 in order for the digital upstream traffic 650 and the digital upstream traffic 660 respectively to arrive at the hybrid amplifier and regenerator (HAR) device C (620) at the correct time (shown by a signal crossing 668) without overlaps or gaps or unintended carrier shifts. Digital upstream traffic 669 shows the digital upstream traffic 650 and the digital upstream traffic 660 combined or multiplexed correctly.

QAM modulation schemes are typically illustrated with a QAM constellation as shown in FIG. 7C. Since it is possible that multiple hybrid amplifier and regenerator (HAR) devices 140 will send upstream traffic to a single hybrid amplifier and regenerator (HAR) device 140, a null position 685 (i.e. no signal) is required in the QAM constellation to ensure that the upstream traffic from the multiple hybrid amplifier and regenerator (HAR) devices 140 can add in an analog fashion without creating constellation offsets in the express band receiver 450 in the upstream hybrid amplifier and regenerator (HAR) device 140. FIG. 7C shows a zero-zero data position (or an all zero position) shared with the null position 685. Alternatively, a dedicated null position (i.e. no signal) could be placed within the QAM constellation. It is important that the null position be input as part of the modulating signal in the express band transmitter 480 and not be formed by grounding out the output of the express band transmitter 480 during that time slot. This is to ensure that inter-symbol interference effects are treated linearly in the distributed express band transmitter 480 and add linearly into the express band receiver 450—which is designed on the assumption of linear inter symbol interference mitigation. If the null position is shared with the zero zero point, a long string of zeros in a virtual channel of the express band 260 is interpreted as no transmission, and packet preambles indicate the start of data with packet formatting indicating the end of data.

Before reliable upstream transmissions can take place in the cable (CATV) network 135, the Hybrid amplifier and regenerator (HAR) devices 140 and the second generation cable modems must be synchronized (or aligned). The synchronization is initially performed during power start-up of the cable (CATV) network 135. Since the second generation cable modems can be added at any time, the alignment and synchronization of the newly connected second generation cable modems can occur at any time.

The Hybrid amplifier and regenerator (HAR) devices 140 are synchronized first. Each digital regenerator 160 in the cable (CATV) network 135 has an unique hardware address and the system head end 144 knows the topology of the digital regenerators 160 in the system. All the regenerators 160 in each Hybrid amplifier and regenerator (HAR) device 140 initially turn off their express band transmitters 480 and listen for commands from the system head end 144 on the downstream control and timing tone band 235. The head end 144 sends a command addressed to the digital regenerator in first Hybrid amplifier and regenerator (HAR) device 140 downstream from the system head end 144 by modulating the downstream control and timing tone (typically using AM modulation as mentioned earlier). The command instructs the digital regenerator 160 to turn on its express band transmitter 480 and send an express band carrier with a specific phase and signal level. A receiver in the head end 144 detects the amplitude and phase of the express band carrier. If there is a significant difference between the desired amplitude and phase of the express band carrier and the actual amplitude and phase of the express band carrier received, the head end 144 sends a command on the downstream control and timing tone band 235 to the digital regenerator 160 to correct the amplitude and phase by the difference. The digital regenerator 160 corrects the phase of the express band carrier by adjusting the signal sent on the express band control line 505 to the express band transmitter 480 (i.e. the integer divider circuit in the control unit 500 now triggers the signal on an appropriate other phase crossing of the downstream control and timing tone). The digital regenerator 160 corrects the signal level by adjusting the signal sent on the express band control line 505 to the express band transmitter 480. (Alternatively, additional phase control can be achieved through an analog phase shifter for very fine control of phase for resolutions smaller than the inter-phase times of the downstream control and timing tone 235). If there is still a significant difference between the desired amplitude and phase of the 15 express band carrier and the actual amplitude and phase of the express band carrier received, the process iterates until the difference between the desired amplitude and phase of the express band carrier and the actual amplitude and phase of the express band carrier received is insignificant.

Once the difference is insignificant, the system head end 144 turns to align the modulated data frame boundaries and symbol boundaries within each data frame of the express band Bitstream 264 from the digital regenerator 160. The system head end 144 sends a command to the regenerator 160 instructing it to send a specific, repeated data sequence. E.g. all zeros in all virtual channels except for the designated virtual channel which carries all ones. The express band symbol rate is derived from the symbol rate of the traffic carried on the downstream control and timing tone. The symbol rates of the ramp band 250, express band 260 and the downstream control and timing tone band 235 are integrally related (related by multiples of whole numbers). In this way, phase lock loops for the express band transmitter 450, the ramp band receiver 460 and the clock for the time slot manager 470 can be synchronized amongst all the digital regenerators 160 by tracking the downstream control and timing band modulation rate. (Preferably, the modulation rate is also integrally related to the downstream control and timing tone or carrier). The system head end 144 receives the specified sequence sent from the digital regenerator 160 and examines it for the relative crossings of the sequence. Any offset from the desired timing (e.g. the crossing from zeros to ones at the maintenance channel boundary) is noted by the head end 144 which in turn sends adjustment commands to the digital regenerator 160. The adjustment commands instruct the digital regenerator to shift the relative crossing of the symbols and repeated data frame by a specified number of phase crossings of the downstream control and timing tone or carrier. After the digital regenerator makes the requested adjustment, the multiplexing should be aligned. If not, other iterations of this process occurs. Since the downstream control and timing tone or carrier is normally many multiples of the modulation rate, vary fine control of each modulated data frame and the symbol boundaries within each data frame is possible.

Once the modulated data frame and symbol boundaries are aligned, the head end 144 sends a command to the digital regenerator 160 on the downstream control and timing tone 235 instructing the digital regenerator 160 to send zeros on all the virtual channels within the express band except the maintenance channel. The digital regenerator 160 (the "upstream digital regenerator") is also instructed by the head end 144 to take over part of the synchronization/alignment function for the digital regenerator 160 in the Hybrid amplifier and regenerator (HAR) device 140 immediately downstream of the upstream digital regenerator (the "downstream digital regenerator"). The head end 144 sends a command on the downstream control and timing tone band 235 to the downstream digital regenerator instructing the downstream digital regenerator 160 to transmit an express band carrier with a certain phase and amplitude. The upstream digital regenerator 160 reports the difference between the desired amplitude and phase of the express band carrier and the actual amplitude and phase of the express band carrier received by the upstream digital regenerator 160 to the system head end 144 in a message sent over the maintenance channel. If there is a significant difference between the desired amplitude and phase of the express band carrier and the actual amplitude and phase of the express band carrier received by the upstream digital regenerator 160, the head end 144 sends a command on the downstream control and timing tone band 235 to the downstream digital regenerator 160 to correct the amplitude and phase by the difference. If there is still a significant difference between the desired amplitude and phase of the express band carrier and the actual amplitude and phase of the express band carrier received by the upstream digital regenerator 160, the process iterates until the difference between the desired amplitude and phase of the express band carrier and the actual amplitude and phase of the express band carrier received by the upstream digital regenerator 160 is insignificant.

Once the amplitude and phase is aligned, the head end turns to align the modulated data frame and symbol boundaries. The head end 144 sends a command to the downstream digital regenerator 160 instructing it to send a specific, repeated data sequence. E.g. all zeros in all virtual channels except for a designated virtual channel which carries all ones. The upstream digital regenerator 160 receives the specified sequence sent from the downstream digital regenerator and examines it for the relative crossings of the sequence. Any offset from the desired timing (e.g. the crossing from zeros to ones at the channel boundary of the designated virtual channel) is noted by the upstream digital regenerator 160 which sends the offset to the system head end 144 in the maintenance channel. In response, the head end 144 sends adjustment commands to the digital regenerator 160. The adjustment commands instruct the downstream digital regenerator 160 to shift the relative crossing of the symbols and repeated data frame by a specified number of phase crossings of the downstream control and timing tone or carrier. The downstream digital regenerator 160 corrects the misalignment of the express band data frame boundaries and the express band symbol boundaries by adjusting the signal sent on the time slot control line 505 to the time slot manager 470 (i.e. the integer divider circuit in the control unit 500 now triggers the signal sent on the time slot control line 505 on an appropriate other phase crossing of the downstream control and timing tone (or carrier)). After the digital regenerator makes the requested adjustment, the multiplexing should be aligned. If not, the process re-iterates.

If more than one downstream hybrid amplifier and regenerator (HAR) device 140 is connected to the upstream hybrid amplifier and regenerator (HAR) device 140, the same process is applied to the other downstream hybrid amplifier and regenerator (HAR) device(s) 140 to align the amplitude, phase, the modulated, data frame and symbol boundaries.

The entire process repeats recursively for all the other digital regenerators in the Hybrid amplifier and regenerator (HAR) devices 140 in the cable (CATV) network 135.

Once all the digital regenerators 160 are synchronized/aligned, the Hybrid amplifier and regenerator (HAR) devices 140 in the cable (CATV) network 135 are ready to receive ramp band traffic. The system head end 144 instructs all the Hybrid amplifier and regenerator (HAR) devices 140 to turn on their ramp band receivers 460 by sending a command in the downstream control and timing tone band 235.

The second generation cable modems register onto the cable (CATV) network 135 using the same procedure used by the second generation cable modems in a cable (CATV) network 5 that does not have any digital regenerators 160 (or Hybrid amplifier and regenerator (HAR) devices 140). That is, the second generation cable modems use the same procedure described in the DOCSIS specification.

When a second generation cable modem is first connected to the cable (CATV) network 135, the second generation cable modem self tunes on the downstream cable modem band 232. As mentioned earlier, the head end 144 periodically sends the time slot allocation map to all the second generation cable modems on the downstream cable modem band 232. The recently connected second generation cable modem acquires the upstream time slot allocation map the next time the head end 144 sends it. The second generation cable modem examines the upstream time slot allocation map for explicitly labelled open (or contention) time slots. The recently connected second generation cable modem will randomly select one of the open time slots and attempt to use it by transmitting a registration request on the open time slot using its lowest signal level. Then the recently connected second generation cable modem waits to see whether a time slot is assigned to it by the head end 144 in the next time slot allocation map sent by the head end 144. If a time slot is not assigned to the recently connected second generation cable modem in the upstream time slot allocation map, the recently connected second generation cable modem randomly selects another open time slot and transmits another registration request on the open time slot using the next highest signal level. This process will continue until the recently connected second generation cable modem sees the time slot it'selected assigned to it in the next upstream allocation map sent by the head end 144.

At the ramp band receivers in each Hybrid amplifier and regenerator (HAR) device 140, the following process occurs. The ramp band receiver 460 in the Hybrid amplifier and regenerator (HAR) device 140 immediately upstream from the recently connected second generation cable modem initially sees an idle line and examines it continuously for a valid packet preamble. All the second generation cable modems uses a specific packet preamble for upstream transmissions. If the recently connected second generation cable modem sends a registration request without a sufficient signal level, the ramp band receiver 460 will not receive a valid packet preamble. In addition, if the recently connected second generation cable modem sends a registration request at the same time that another recently connected second generation cable modem is transmitting, it is unlikely the ramp band receiver 460 will receive a valid registration request. Once the recently connected second generation cable modem sends a registration request with a sufficient signal level during an open time slot (i.e. no collisions with data from another second generation cable modem), the ramp band receiver 460 will receive a valid packet preamble and data containing the registration request. The Hybrid amplifier and regenerator (HAR) device 140 multiplexes the data containing the registration request into the designated virtual channel of the express band 260. Once the system head end 144 receives the registration request in the designated virtual channel, the system head end 144 assigns the time slot used by the recently connected second generation cable modem to the recently connected second generation cable modem and sends another time slot allocation map to all the second generation cable modems. Furthermore, the system head end 144 will send a command to all the Hybrid amplifier and regenerator (HAR) devices 140 which use the same virtual channel to examine the signal level, the timing and frequency of the recently connected second generation cable modem during the time slot used by the recently connected second generation cable modem. The system head end 144 must send commands to all the HAR's 140 which use the same virtual channel because there is no way the system head end 144 knows from which HAR 140 received the original registration request from the recently connected second generation cable modem. (The system head end 144 only knows that a registration request has been mapped into a specific virtual channel which may be used by multiple HAR's 140).

When the system head end 144 allocates an open time slot for any recently connected second generation cable modem to join the cable (CATV) network 135, the system head end 144 does not know where the recently connected second generation cable modem 144, if any, will be attached. Thus, during the free time slots (as specified in the time slot allocation map), all the HAR's 140 turn on their ramp band receivers 460 to detect initial transmission from any recently connected second generation cable modems. Alternatively, if during the open time slots, the HAR's 140 are set to note which ramp band receiver 460 (in the respective HAR 140) is receiving a valid transmission and this is communicated to the system head end 144 over the maintenance channel (along with the identification of the respective HAR 140), then the system head end 144 could limit the commands for fine tuning the cable modem transmissions to the ramp band receiver 460 in the respective HAR 140. However, this alternative approach adds complexity.

If the ramp band receiver 460 of the Hybrid amplifier and regenerator (HAR) device 140 servicing the new second generation cable modem detects errors in the frequency, timing (i.e. time slot boundaries of the time slot), or signal level, the digital regenerator 160 reports the errors to the system head end 144 over the virtual maintenance channel. The system head end 144 sends adjustment commands to the recently connected second generation cable modem on the downstream cable modem transmission band 232 instructing the recently connected second generation cable modem to change its frequency, timing or signal level. Once the recently connected second generation cable modem is fine tuned, normal upstream transmission/traffic from the recently connected second generation cable modem to the head end 144 can proceed.

Other variations and modifications of the invention are possible. For example, different upstream traffic (e.g. telephony and Internet) can be carried simultaneously in different transmission formats within an analog band (e.g. QPSK, QAM, FSK, PSK, CDMA, etc). The ramp band 150 and the express band 260 will typically each handle a single transmission format. If all the upstream traffic is carried in a transmission format used by the ramp band 250, then the reverse secondary analog amplifier 415 within each hybrid amplifier and regenerator (HAR) device is not required. (However, if a transmission format(s) for upstream traffic other than the transmission format used by the ramp band 250 is used, then the reverse secondary analog amplifier 415 in each hybrid amplifier and regenerator (HAR) device may be used to boost the upstream traffic (other than the ramp band and express band traffic).

Variations of the cable (CATV) network 135 are also possible. For example, the conventional trunk analog distribution amplifiers and analog distribution amplifiers can coexist in the same network with hybrid amplifier and regenerator (HAR) devices 140, It is an engineering system design decision to determine the relative placement and spacing of these units. (For example, hybrid amplifier and regenerator (HAR) devices 140 may be placed on the trunk and the secondary trunks only and conventional analog distribution amplifiers may be placed on the feeder lines and the secondary feeder lines. Alternatively, hybrid amplifier and regenerator (HAR) devices, conventional trunk analog distribution amplifiers and conventional analog amplifiers can be placed in cyclic positions from the system head end 144 on the trunk 20, secondary trunks 25, feeder lines 30 and secondary feeder lines 35)

Figure 8:
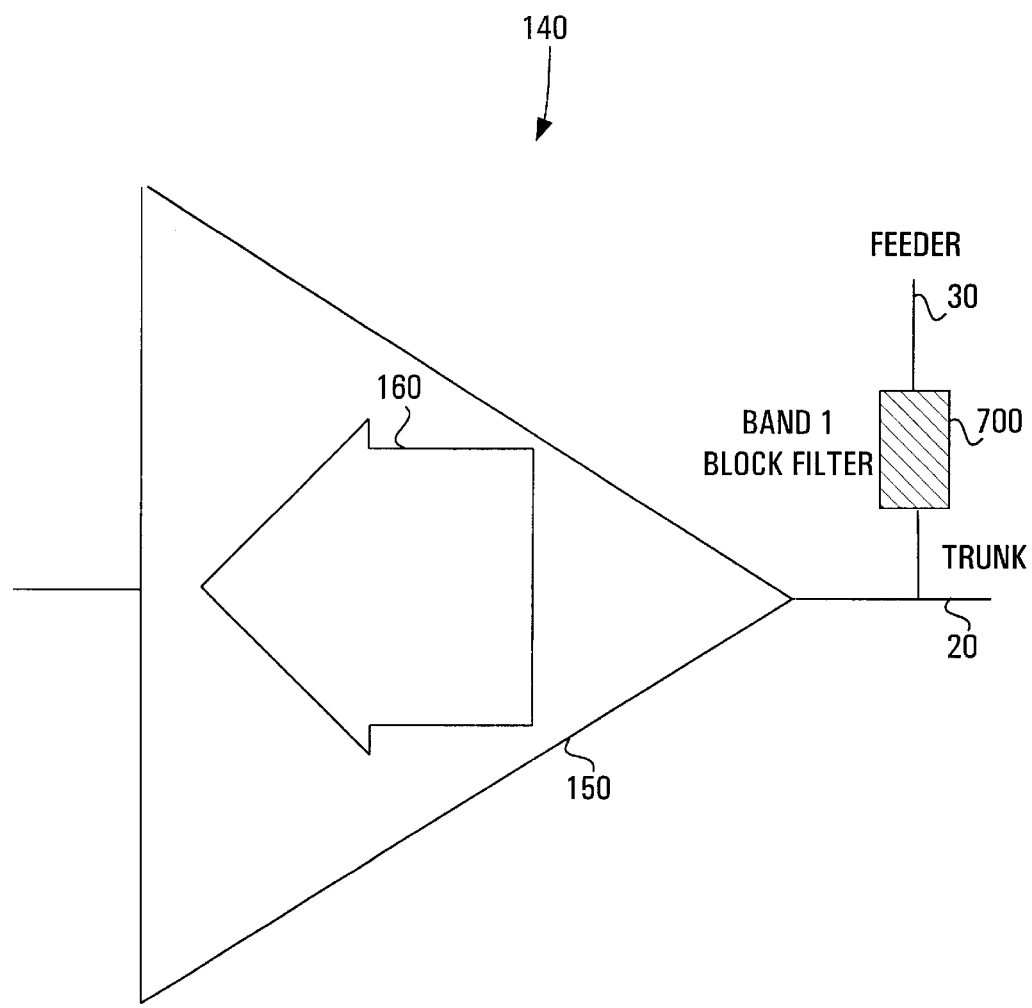
FIG. 8 is a block diagram illustrating another preferred embodiment in which an express band block filter is placed on a feeder line near the trunk.

Another variation of the cable (CATV) network 135 is possible. Referring in particular to FIG. 8, the hybrid amplifier and regenerator (HAR) devices are located only on the trunk 20 and the secondary trunks 25 (i.e. no hybrid amplifier and regenerator (HAR) devices 150 on the feeder lines 30 and the secondary feeder lines 35). Conventional analog distribution amplifiers are used on the feeder lines 30 and the secondary feeder lines to boost the first, the second and third type of downstream traffic and the first, second and third type of upstream traffic. In particular, ramp band traffic in the ramp band 250 from the second generation cable modems are boosted by the conventional analog distribution amplifiers.

The upstream traffic is carried by the secondary feeder lines 35 and the feeder lines 30 to the hybrid amplifier and regenerator (HAR) devices at each junction where the feeder line 30 meets the trunk 20 or a secondary trunk 25. Since the express band 260 is not used on the feeder lines 30, the secondary feeder lines 35 and the subscriber lines 62, an express band block filter 700 can be placed on each feeder line 30 near each junction where each feeder line 30 meets the trunk 20 or a secondary trunk 25. The express band block filters prevent any signal or noise located in the express band 260 from entering the trunk 20 or any secondary trunk 25 from the feeder lines 30. Since cable subscribers 60 are not typically connected to the trunk 20 or the secondary trunks 25, noise in the express band 260 in the trunk 20 and the secondary trunks 25 is typically minimal. This reduction is noise improves the reliability and capacity of upstream traffic carried in the express band in the trunk 20 and the secondary trunks 25. (It is also possible to physically place the express band block filter 700 inside each hybrid amplifier and regenerator (HAR) device near each junction where each feeder line 30 meets the trunk 20 or a secondary trunk 25).

Figure 9:
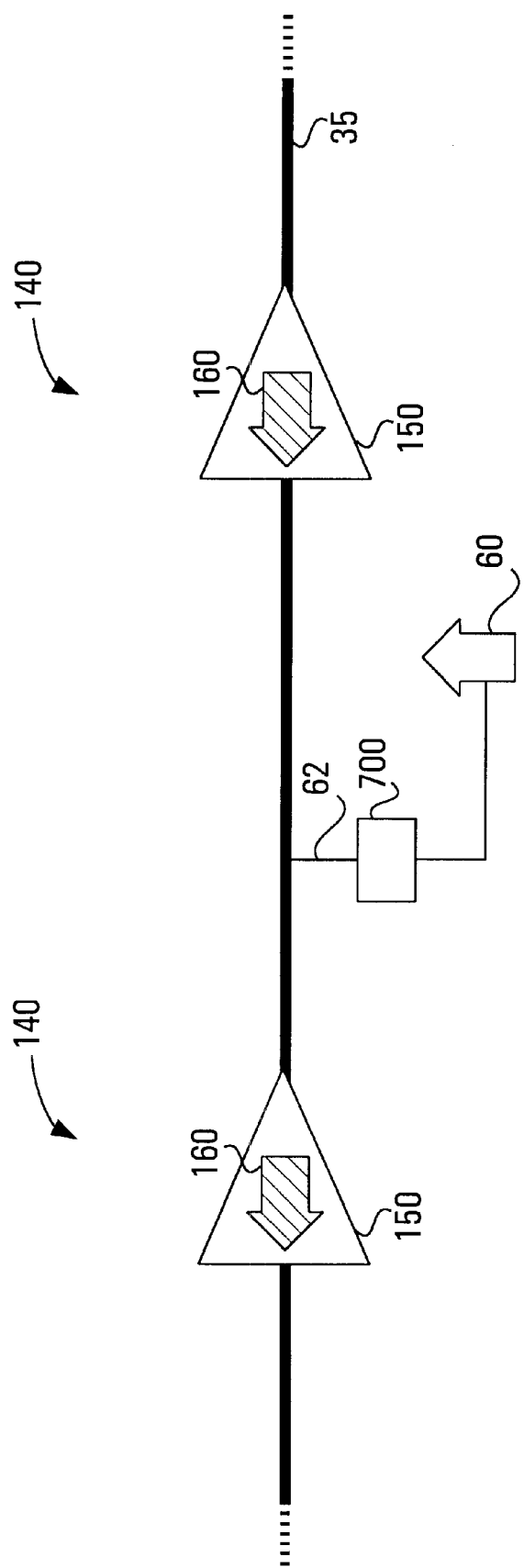
FIG. 9 is a block diagram illustrating another preferred embodiment in which an express band block filter is placed on a line to a cable subscriber.

Furthermore, in the extreme, another variation to the cable (CATV) network 135 is possible. Referring in particular to FIG. 9, an express band block filter 700 can be placed on every line 62 to each cable subscriber 60. These express band block filters block or prevent any signal or noise in the express band 260 in the subscriber lines 62 from entering the feeder lines 30 or the secondary feeder lines 35. Consequently, the ingress noise in the express band is typically substantially reduced in the trunk 20, the secondary trunks 25, the feeder lines 30 and the secondary feeder lines 35. This reduction in noise improves the reliability and capacity of upstream traffic carried in the express band.

Yet another variation to the cable (CATV) network is possible. Referring in particular to FIGS. 10 and 11, a first modified type of the hybrid amplifier and regenerator (HAR) device can be used in the feeder lines 30 and the secondary feeder lines 35. As shown in FIG. 10, the control unit 500 is modified so that the time slot manager 470 maps ramp band traffic 720 from a Hybrid amplifier and regenerator (HAR) device 140 into multiple virtual channels 730 in the express band Bitstream 740. Ramp band traffic from different Hybrid amplifier and regenerator (HAR) devices 140 are mapped into different multiple virtual channels in the express band Bitstream 740. This mapping (or multiplexing) technique provides redundancy and improved noise resilience in the cable (CATV) network. A second modified type of hybrid amplifier and regenerator (HAR) device is located near each junction where each feeder line 30 meets the trunk 20 or a secondary trunk 25. Referring to FIG. 11, the control unit 500 is modified so that the time slot manager 470 maps the multiple virtual channels 730 containing the ramp band traffic from the Hybrid amplifier and regenerator (HAR) device 140 into one virtual channel 745 in the express band Bitstream 748. If possible, any discrepancies between the virtual channels are corrected by the second modified type of hybrid amplifier and regenerator (HAR) device. The remaining hybrid amplifier and regenerator (HAR) devices 140 on the trunk 20 and the secondary trunks 25 are not modified.

Another variation of the invention is possible. A plurality of ramp bands can be used. In this embodiment, ramp band traffic is the second type of upstream traffic carried in the ramp bands. All the ramp bands are separate from each other and are separate from the express band 260. All the ramp bands and the express band 260 are in the reverse frequency band 240. The ramp bands and the express band 260 are typically located below the first general upstream band 242 and above the second general upstream band 244.

The ramp band traffic is carried in the cable (CATV) network 5 using digital signals modulated on a plurality of ramp band carriers using digital modulation techniques such as Quadrature Phase Shift Keying (QPSK) or Quadrature Amplitude Modulation (QAM). Each ramp band carrier is located in each ramp band respectively. The same modulation technique or different modulation techniques may be used on each ramp band. The speed of the ramp band traffic may be the same or different on each ramp band. (As mentioned earlier, the speed of the ramp band traffic typically will be between 320 Kbits/sec and 10 Mbits/sec).

A third modified type of hybrid amplifier and regenerator (HAR) device is used to map the upstream traffic in the ramp bands into the express band 260. There are a plurality of ramp band receivers, one for each ramp band, in each third modified type of hybrid amplifier and regenerator (HAR) device. The ramp band receivers are designed to detect the digital signals carried on each of the ramp bands and convert them into a plurality of ramp band Bitstreams. Each ramp band Bitstream consists of a series of digital bits. For each ramp band, a fixed number of digital bits constitutes a ramp band symbol. Depending on the modulation scheme used for the respective ramp band traffic carried on each respective ramp band, the fixed number of digital bits constituting a ramp band symbol may be different or the same for the respective ramp band traffic carried on each respective ramp band. Each ramp band Bitstream contains the ramp band traffic carried on each ramp band respectively. (In particular, the ramp band receivers typically detect the phase and amplitude of the ramp band carriers carried in the ramp bands in order to detect and convert the digital signals carried in the respective ramp band traffic into the respective ramp band Bitstreams). A modified time slot manager and a modified control unit are used to map the each ramp band symbol in each ramp band Bitstream into the express band Bitstream. The modified control unit co-ordinates the digital time division multiplexing used to map the ramp band traffic from the ramp bands into the express band traffic carried in the express band 260.

Figure 12:
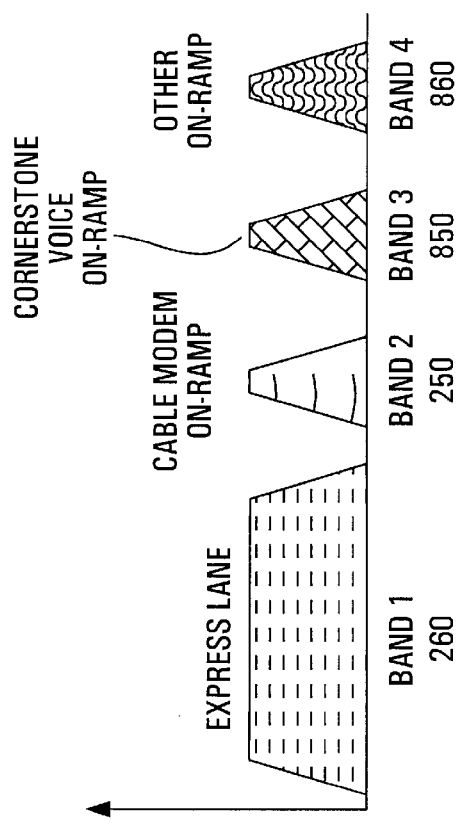
FIG. 12 is a frequency spectrum plan showing three ramp bands and one express band used in another embodiment of the present invention.

FIG. 12 shows three ramp bands 250, 850 and 860 and one express band 260. The ramp band 250 carries the ramp band traffic from the second generation cable modems. The ramp band 850 carries the ramp band traffic for Cornerstone Voice*, a product offered by Nortel*. Cornerstone Voice* uses special cable modems which provide telephony capability to cable subscribers. The ramp band 860 carries other ramp band traffic. As shown in FIG. 12, the ramp band 250 and the ramp band 850 have the same bandwidth. The ramp band 860 has a smaller bandwidth than the ramp bands 250 and 860. FIG. 12 also shows different modulation schemes for each ramp band (shown by the different hatching).

Figure 13:
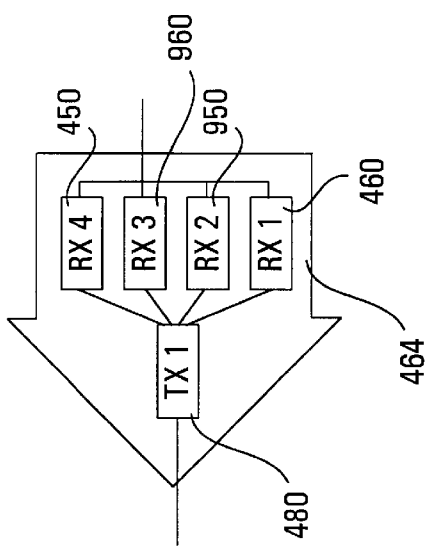
FIG. 13 is a simplified block diagram of a digital regenerator used in the a modified type of hybrid amplifier and regenerator (HAR) device.

Referring to FIG. 13, the third modified type of hybrid amplifier and regenerator (HAR) device is used to map the upstream traffic in ramp bands 250, 850 and 860 into the express band 260. In addition to the ramp band receiver 460, the digital regenerator 464 in the third modified type of hybrid amplifier and regenerator (HAR) device utilizes two additional ramp band receivers 950, 960. The ramp band receivers 460, 950 and 960 are designed to detect and convert the digital signals carried the ramp bands 250, 850 and 860 respectively into three ramp band Bitstreams. (In particular, the ramp band receivers 460, 950 and 960 detect the phase and amplitude of the ramp band carriers carried in the ramp bands 250, 850 and 860 respectively). A modified time slot manager *Trade-maark is used to map the each ramp band symbol in each ramp band Bitstream into the express band. A modified control unit coordinates the digital time division multiplexing used to map the upstream traffic from the ramp bands into the express band Bitstream.

Another variation of the invention is possible. The upstream traffic in one ramp band can be mapped into a plurality of express bands using digital time division multiplexing. In this embodiment, express band traffic is the second type of upstream traffic carried in the express bands. All the express bands are separate from each other and are separate from the ramp band 250. All the express bands and the ramp band 250 are in the reverse frequency band 240. The express bands and the ramp band 250 are typically located below the first general upstream band 242 and above the second general upstream band 244.

The express band traffic is carried in the cable (CATV) network 135 using digital signals modulated on a plurality of express band carriers using known modulation techniques such as 16 or 64 Quadrature Amplitude Modulation (QAM). Each express band carrier is located in each express band respectively. The same modulation technique or different modulation techniques may be used on each express band. The speed of the express band traffic may be the same or different on each express band. It is normally the same. (As mentioned earlier, the speed of the express band traffic typically will be between 20 Mbits/sec and 40 Mbits/sec).

A fourth modified type of hybrid amplifier and regenerator (HAR) device is used to map the upstream traffic in the ramp band 250 into the express bands. There are a plurality of express band receivers, one for each express band, in each fourth modified type of hybrid amplifier and regenerator (HAR) device. All the express band receivers are designed to detect and convert the digital signals carried in each respective express band into a plurality of express band Bitstreams. Each express band Bitstream consists of a series of digital bits. A second modified time slot manager and a second modified control unit are used to map the each ramp band symbol in the ramp band Bitstream typically into one of the express band Bitstreams. The second modified control unit coordinates the digital time division multiplexing used to map the ramp band traffic from the ramp band into the express band Bitstreams. (For example, a plurality of fourth modified type of hybrid amplifier and regenerator (HAR) devices in one part of the cable (CATV) network can map the ramp band traffic into a certain express band. Another plurality of fourth modified type of hybrid amplifier and regenerator (HAR) devices in another part of the cable (CATV) network can map the ramp band traffic into another express band, etc). The second modified time slot manager could also map each ramp band symbol in the ramp band Bitstream into a plurality of the express band Bitstreams or all of the express band Bitstreams for redundancy and improved resilience.

Yet another variation of the invention is possible. The ramp band traffic in a plurality of ramp bands can be mapped into a plurality of express bands using digital time division multiplexing. This variation is suitable for cable (CATV) networks that have heterogeneous cable modems which have non-interchangeable related modulation rates. In this embodiment, the express band traffic is the second type of upstream traffic carried in the express bands. All the express bands are separate from each other and are separate from the ramp bands 250. All the express bands and the ramp band 250 are in the reverse frequency band 240. The express bands and the ramp bands 250 are typically located below the first general upstream band 242 and above the second general upstream band 244.

The express band traffic is carried in the cable (CATV) network 135 using digital signals modulated on a plurality of express band carriers using known modulation techniques such as 16 or 64 Quadrature Amplitude Modulation (QAM). Each express band carrier is located in each express band respectively. The same modulation technique or different modulation techniques may be used on each express band. The speed of the express band traffic may be the same or different on each express band. It is normally the same. (As mentioned earlier, the speed of the express band traffic, typically will be between 20 Mbits/sec and 40 Mbits/sec). This embodiment requires multiple downstream control and timing tones (one for each express band).

Certain Hybrid amplifier and regenerator (HAR) devices 140 map the ramp band traffic in one of the ramp bands to one of the express bands. Other Hybrid amplifier and regenerator (HAR) devices 140 map the ramp band traffic in another ramp band to another express band, etc.

All such modifications or variations are believed to be within the sphere and scope of the invention as defined by the claims appended hereto.

We claim:

1. A hybrid amplifier and regenerator (HAR) device for use in a communications network for carrying downstream traffic in a forward frequency band and for carrying digital upstream traffic in a reverse frequency band spaced from the forward frequency band and below the forward frequency band, the hybrid amplifier and regenerator (HAR) device comprising:

an analog amplifier for amplifying said downstream traffic; and a digital regenerator, wherein said digital regenerator comprises:

mapping circuitry for mapping digital upstream traffic carried in at least one ramp band which is part of the reverse frequency band to digital upstream traffic carried in at least one express band which is also part of the reverse frequency band but spaced from the at least one ramp band, wherein the at least one express band transports upstream traffic at a substantially higher data rate as compared to the at least one ramp band so that upstream traffic originating from a plurality of sources can be aggregated from the at least one ramp band into the at least one express band; and an express band transmitter for transmitting digital upstream traffic from the mapping circuitry in the at least one express band.

2. A hybrid amplifier and regenerator (HAR) device according to claim 1, wherein said mapping circuitry uses digital time division multiplexing to map the digital upstream traffic carried in said at least one ramp band to the digital upstream traffic carried in said at least one express band.

3. A hybrid amplifier and regenerator (HAR) device according to claim 2, wherein there are a plurality of ramp bands and only one express band.

4. A hybrid amplifier and regenerator (HAR) device according to claim 2, wherein there are a plurality of express bands and only one ramp band.

5. A hybrid amplifier and regenerator (HAR) device according to claim 2, wherein there are only one ramp band and one express band.

6. A hybrid amplifier and regenerator (HAR) device according to claim 5, wherein said mapping circuitry comprises:
   a diplex filter to separate the digital upstream traffic carried in the ramp band from the digital upstream traffic carried in the express band;
   a ramp band receiver to detect the digital upstream traffic carried in the ramp band, said ramp band receiver being connected to the diplex filter;
   an express band receiver to detect the digital upstream traffic carried in the express band, said express band receiver being connected to the diplex filter;
   a time slot manager for mapping the digital upstream traffic carried in the ramp band from the ramp band receiver to the digital upstream traffic carried in the express band from the express band receiver, said time slot manager being connected to the ramp band receiver and the express band receiver; and
   a control unit for controlling the mapping of the digital upstream traffic carried in the ramp band to the digital upstream traffic carried in the express band, said control unit being connected to the time slot manager, the ramp band receiver and the express band receiver.

7. A hybrid amplifier and regenerator (HAR) device according to claim 1 further comprising a reverse secondary analog amplifier for amplifying upstream traffic carried in at least one general upstream band which is part of the reverse frequency band but spaced from the at least one ramp band and the at least one express band.

8. A hybrid amplifier and regenerator (HAR) device according to claim 7, wherein the reverse secondary analog amplifier comprises:
   a diplex or a triplex filter to separate the upstream traffic carried in the at least one general band from the upstream traffic carried in the at least one ramp band and the at least one express band; and
   an analog amplifier for amplifying the upstream traffic carried in at least one general upstream band.

9. A hybrid amplifier and regenerator (HAR) according to claim 7, wherein said at least one general frequency band comprises a first general frequency band and a second general frequency band.

10. A digital regenerator for use in hybrid amplifier and regenerator (HAR) device, the digital regenerator comprising:
    mapping circuitry for mapping digital upstream traffic carried in at least one ramp band which is part of a reverse band to digital upstream traffic carried in at least one express band which is also part of the reverse band but spaced from the at least one ramp band, wherein the at least one express band transports upstream traffic data at a substantially higher data rate as compared to the at least one ramp band so that upstream traffic originating from a plurality of sources can be aggregated from the at least one ramp band into the at least one express band; and
    an express band transmitter for transmitting digital upstream traffic from the mapping circuitry in said at least one express band.

11. A digital regenerator according to claim 10, wherein said mapping circuitry uses digital time division multiplexing to map the digital upstream traffic carried in said at least one ramp band to the digital upstream traffic carried in said at least one express band.

12. A digital regenerator according to claim 11, wherein there are a plurality of ramp bands and only one express band.

13. A digital regenerator according to claim 11, wherein there are a plurality of express bands and only one ramp band.

14. A digital regenerator according to claim 11, wherein there are only one ramp band and one express band.

15. A digital regenerator according to claim 14, wherein said mapping circuitry comprises:
    a diplex filter to separate the digital upstream traffic carried in the ramp band from the digital upstream traffic carried in the express band;
    a ramp band receiver to detect the digital upstream traffic carried in the ramp band, said ramp band receiver being connected to the diplex filter;
    an express band receiver to detect the digital upstream traffic carried in the express band, said express band receiver being connected to the diplex filter;
    a time slot manager for mapping the digital upstream traffic carried in the ramp band from the ramp band receiver to the digital upstream traffic carried in the express band from the express band receiver, said time slot manager being connected to the ramp band receiver and the express band receiver; and
    a control unit for controlling the mapping of the digital upstream traffic carried in the ramp band to the digital upstream traffic carried in the express band, said control unit being connected to the time slot manager, the ramp band receiver and the express band receiver.

16. A communications network for carrying downstream traffic from a system head end to a plurality of cable subscribers within a forward frequency band, and for carrying digital upstream traffic from the plurality of cable subscribers to the system head end in a reverse frequency band which is spaced from the forward frequency band and below the forward frequency band, the communications network comprising:
    (a) transmission means for interconnecting the system head end and the plurality of cable subscribers;
    (b) a plurality of hybrid amplifier and regenerator (HAR) devices located at spaced intervals along the transmission means, each hybrid amplifier and regenerator (HAR) device comprising:
       amplification circuitry for amplifying said downstream traffic; and
       a digital regenerator, wherein said digital regenerator comprises:
          mapping circuitry for mapping digital upstream traffic carried in at least one ramp band which is part of the reverse frequency band to digital upstream traffic carried in at least one express band which is also part of the reverse frequency band but spaced from the at least one ramp band, wherein the at least one express band transports upstream traffic data at a substantially higher data rate as compared to the at least one ramp band so that upstream traffic originating from a plurality of sources can be aggregated from the at least one ramp band into the at least one express band; and
          an express band transmitter for transmitting digital upstream traffic from the mapping circuitry in said at least one express band; and (c) cable modems for receiving the downstream traffic for the cable subscribers and for sending the digital upstream traffic from the cable subscribers in said at least one ramp band.

17. A communications network according to claim 16, wherein the transmission means comprise a trunk, a plurality of secondary trunks, a plurality of feeder lines, a plurality of secondary feeder lines and a plurality of subscriber lines.

18. A communication network according to 17, wherein the trunk and the secondary trunks use fibre optic cable, the feeder lines, the secondary feeder lines and the subscriber lines use coaxial cable and the transmission means further comprise a plurality of fibre nodes used to interconnect the coaxial cable with the fibre optic cable.

19. A communications network according to claim 17, wherein the transmission means use coaxial cable.

20. A communications network according to claim 17 further comprising a plurality of express band block filters, each express band block filter being placed on each feeder line near the trunk or near one of the secondary trunks.

21. A communications network according to claim 17 further comprising a plurality of express band block filters, each express band block filter being placed on each subscriber line.

22. A communications network according to claim 17 further comprising a plurality of trunk analog distribution amplifiers located at spaced intervals along the trunk and the secondary trunks and a plurality of analog distribution amplifiers located at spaced intervals along the feeder lines and the secondary feeder lines and wherein the trunk analog distribution amplifiers and the analog distribution amplifiers amplify the downstream traffic and the upstream traffic.

23. A method for carrying in a communications network downstream traffic in a forward frequency band and digital upstream traffic in a reverse frequency band which is spaced from the forward frequency band and below the forward frequency band, the method comprising:

amplifying and transmitting said downstream traffic in the forward frequency band;

mapping digital upstream traffic carried in at least one ramp band which is part of the reverse frequency band to digital upstream traffic carried in at least one express bands which is also part of the reverse frequency band but spaced from the at least one ramp band, wherein the at least one express band transports upstream traffic data at a substantially higher data rate as compared to the at least one ramp band so that upstream traffic originating from a plurality of sources can be aggregated from the at least one ramp band into the at least one express band; and transmitting digital upstream traffic in the at least one express band.

24. A method according to claim 23, wherein the mapping uses digital time division multiplexing.

25. A method according to claim 24, wherein there are a plurality of ramp bands and only one express band.

26. A method according to claim 24, wherein there are a plurality of express bands and only one ramp band.

27. A method according to claim 24, wherein there are only one ramp band and one express band.

28. A method for processing digital upstream traffic in a digital regenerator, the method comprising:

mapping digital upstream traffic carried in at least one ramp band which is part of the reverse frequency band to digital upstream traffic carried in at least one express band which is also part of the reverse frequency band but spaced from the at least one ramp band, wherein the at least one express band transports upstream traffic data at a substantially higher data rate as compared to the at least one ramp band so that upstream traffic originating from a plurality of sources can be aggregated from the at least one ramp band into the at least one express band; and transmitting digital upstream traffic in the at least one express band.

29. A method according to claim 28, wherein said mapping uses digital time division multiplexing.

30. A method according to claim 29, wherein there are a plurality of ramp bands and only one express band.

31. A method according to claim 29, wherein there are a plurality of express bands and only one ramp band.

32. A method according to claim 29, wherein there are only one ramp band and one express band.

33. A hybrid amplifier and regenerator (HAR) device for use in a communications network for carrying downstream traffic in a forward frequency band and for carrying digital upstream traffic in a reverse frequency band spaced from the forward frequency band and below the forward frequency band, the hybrid amplifier and regenerator (EAR) device comprising:

an analog amplifier for amplifying said downstream traffic; and a digital regenerator, wherein said digital regenerator comprises:

mapping circuitry for mapping digital upstream traffic carried in a ramp hand which is part of the reverse frequency hand to a plurality of virtual channels carried in an express band which is also part of the reverse frequency band but spaced from the ramp band, wherein the at least one express band transports upstream traffic data at a substantially higher data rate as compared to the at least one ramp band so that upstream traffic originating from a plurality of sources can be aggregated from tie at least one ramp band into the at least one express band; and an express band transmitter for transmitting the virtual channels from the mapping circuitry in the express band.

34. A hybrid amplifier and regenerator (HAR) device for use in a communications network for carrying downstream traffic in a forward frequency band and For carrying digital upstream traffic in a reverse frequency band spaced from the forward frequency band and below the forward frequency band, the hybrid amplifier and regenerator (HAR) device comprising:

an analog amplifier for amplifying said downstream traffic, and a digital regenerator, wherein said digital regenerator comprises:

mapping circuitry for mapping digital upstream traffic carried in a plurality of virtual channels in an express band which is part of the reverse frequency band to a single virtual channel in the express band, wherein the at least one express band transports upstream traffic data at a substantially higher data rate as compared to the at least one ramp band so that upstream traffic originating from a plurality of sources can be aggregated from the at least one ramp band into the at least one express band; and an express band transmitter for transmitting the single virtual channel from the mapping circuitry in the express band.

35. A digital regenerator for use in a hybrid amplifier and regenerator (HAR) device, the digital regenerator comprising:

mapping circuitry for mapping digital upstream traffic carried in a ramp band which is part of a reverse frequency band to a plurality of virtual channels carried in an express band which is also part of the reverse frequency band but spaced from the ramp band, wherein the at least one express band transports upstream traffic data at a substantially higher data rate as compared to the at least one ramp band so that upstream traffic originating from a plurality of sources can be aggregated from the at least one ramp band into the at least one express band; and an express band transmitter for transmitting the virtual channels from the mapping circuitry in the express band.

36. A digital regenerator for use in a hybrid amplifier and regenerator (HAR) device the digital regenerator comprising:

mapping circuitry for mapping digital upstream traffic carried in a plurality of virtual channels in an express band which is part of a reverse frequency band to a single virtual channel in the express band, wherein the single virtual channel transports upstream traffic data at a substantially higher data rate as compared to any one of the plurality of virtual channels so that upstream traffic originating from a plurality of sources can be aggregated from the plurality of virtual channels into the single virtual channel; and an express band transmitter for transmitting the single virtual channel from the mapping circuitry in the express band.

37. A method for multiplexing a plurality of express band transmissions, each express band transmission having a duration, from a plurality of respective downstream hybrid amplifier and regenerator (HAR) devices at an upstream hybrid amplifier and regenerator (HAR) device in a communications network, the method comprising:

a) determining a start time for each express band transmission which ensures that the express band transmissions will arrive at the upstream hybrid amplifier and regenerator (HAR) device without interfering with each other, and, b) beginning each express band transmission from each respective downstream hybrid amplifier and regenerator (HAR) device at each respective start time;

wherein the transmitting step uses a Quadrature Amplitude Modulation (QAM) scheme represented by a QAM constellation having a null position.

38. A method according to claim 37, wherein the QAM constellation has an all zero position and the all zero position is shared with the null position.

39. A method for multiplexing a plurality of express band transmissions, each express band transmission having a duration and being modulated on an express band carrier within an express band, from a plurality of respective downstream hybrid amplifier and regenerator (HAR) devices at an upstream hybrid amplifier and regenerator (HAR) device in a communications network having a head end, the method comprising:

a) transmitting from the head end a downstream control and timing tone in an downstream control and timing tone band which is separate and apart from the express band wherein the express band carrier is an integral sub-multiple of the downstream control and timing tone.

b) determining a signal crossing of the downstream control and timing tone for each express band transmission upon which each respective express band transmission will begin which ensures that the express band transmissions will arrive at the upstream hybrid amplifier and regenerator (HAR) device without interfering with each other; and, c) beginning each express band transmission from each respective downstream hybrid amplifier and regenerator (HAR) device at each respective signal crossing.

* * * * *

UNITED STATES PATENT AND TRADEMARK OFFICE
CERTIFICATE OF CORRECTION

PATENT NO.    : 6,598,232 B1  Page 1 of 1
DATED         : July 22, 2003
INVENTOR(S)   : James A. McAlear It is certified that error appears in the above-identified patent and that said Letters Patent is hereby corrected as shown below:

<u>Column 32,</u>
Line 28, the word "hand" should be -- band --.
Line 29, the word "hand" should be -- band --.
Line 43, the word "For" should be -- for --.

Signed and Sealed this

Fifteenth Day of June, 2004

JON W. DUDAS
*Acting Director of the United States Patent and Trademark Office*